(12) United States Patent
Quibelan et al.

(10) Patent No.: US 10,970,989 B1
(45) Date of Patent: Apr. 6, 2021

(54) PROXIMITY ALERT DEVICE AND METHOD

(71) Applicant: Tereo Corporation, Inc., San Jose, CA (US)

(72) Inventors: Raymond Quibelan, San Jose, CA (US); Michael Mark McCrary, San Mateo, CA (US)

(73) Assignee: Tereo Corporation, Inc., San Jose, CA (US)

( * ) Notice: Subject to any disclaimer, the term of this patent is extended or adjusted under 35 U.S.C. 154(b) by 0 days.

(21) Appl. No.: 17/031,489

(22) Filed: Sep. 24, 2020

Related U.S. Application Data

(60) Provisional application No. 62/907,069, filed on Sep. 27, 2019.

(51) Int. Cl.
*G08B 21/24* (2006.01)
*G08B 21/18* (2006.01)
(Continued)

(52) U.S. Cl.
CPC .......... *G08B 21/182* (2013.01); *G08B 21/24* (2013.01); *H04B 17/318* (2015.01); *H04W 4/80* (2018.02);
(Continued)

(58) Field of Classification Search
CPC .... G08B 21/182; G08B 21/24; H04B 17/318; H04B 2001/0416; H04W 76/14; H04W 4/80
See application file for complete search history.

(56) References Cited

U.S. PATENT DOCUMENTS 5,490,287 A * 2/1996 Itoh ..................... H04W 52/362
358/442
5,796,338 A 8/1998 Mardirossian
(Continued)

FOREIGN PATENT DOCUMENTS

CN 101471703 A 7/2009
CN 105376702 3/2016
(Continued)

OTHER PUBLICATIONS

Chipolo; https://chipolo.net/en; last visited Nov. 16, 2020.
(Continued)

*Primary Examiner* — Munear T Akki
(74) *Attorney, Agent, or Firm* — Headland Law & Strategy

(57) ABSTRACT

A proximity alert device may include a processor, non-volatile memory, a user input device, a radio transceiver, and primary memory that stores program instructions. When executed by the processor, the program instructions may perform a method that includes loading a configuration value from the non-volatile memory and setting a transmission power level of the radio transceiver to a configuration power level; pairing with a protected device that has a corresponding radio transceiver; receiving input from the user input device to adjust the transmission power level up or down; in response to receiving the input, and based upon that input, adjusting the transmission power level up or down, and saving to the non-volatile memory the adjusted transmission power level as a calibrated power level; detecting a loss of connection with the paired protected device; and, in response to detecting the loss of connection, triggering an alarm.

19 Claims, 11 Drawing Sheets

(51) Int. Cl.
  *H04W 4/80* (2018.01)
  *H04B 17/318* (2015.01)
  *H04W 76/14* (2018.01)
  *H04B 1/04* (2006.01)
(52) U.S. Cl.
  CPC ..... *H04W 76/14* (2018.02); *H04B 2001/0416* (2013.01)

(56) References Cited

U.S. PATENT DOCUMENTS

| | | | |
|---|---|---|---|
| 6,002,334 | A | 12/1999 | Dvorak |
| 6,885,848 | B2 | 4/2005 | Lee |
| 7,098,786 | B2 | 8/2006 | Dvorak et al. |
| 7,848,704 | B2 | 12/2010 | Smith |
| 7,848,905 | B2 | 12/2010 | Troxler et al. |
| 7,973,657 | B2 | 7/2011 | Ayed |
| 9,087,226 | B2 * | 7/2015 | Batra .................. H04B 5/0062 |
| 9,385,821 | B2 | 7/2016 | Jin et al. |
| 9,443,366 | B2 | 9/2016 | Rayner |
| 9,596,560 | B2 | 3/2017 | Diamond et al. |
| 9,675,152 | B2 | 6/2017 | Lim et al. |
| 9,692,844 | B2 | 6/2017 | Messenger et al. |
| 9,967,713 | B2 | 8/2018 | Buchheim et al. |
| 2002/0036569 | A1 | 3/2002 | Herbert et al. |
| 2008/0144506 | A1 * | 6/2008 | Kanda .................... G08C 15/00 370/235 |
| 2010/0283600 | A1 | 11/2010 | Herbert et al. |
| 2012/0257657 | A1 | 10/2012 | Subrahmanya et al. |
| 2012/0276942 | A1 | 11/2012 | Mason et al. |
| 2014/0196116 | A1 | 7/2014 | Maguire |
| 2015/0029021 | A1 * | 1/2015 | Defant ................... G08B 29/22 340/514 |
| 2015/0170496 | A1 * | 6/2015 | King ....................... G08B 21/24 340/686.6 |
| 2016/0014550 | A1 | 1/2016 | Chiddarwar et al. |
| 2017/0195735 | A1 | 7/2017 | Kaliamoorthi et al. |
| 2017/0214748 | A1 | 7/2017 | Granqvist et al. |
| 2017/0251440 | A1 | 8/2017 | Gilson et al. |
| 2018/0151043 | A1 | 5/2018 | Liu |
| 2020/0064487 | A1 | 2/2020 | Krzych et al. |
| 2020/0128482 | A1 | 4/2020 | Daoura et al. |
| 2020/0275369 | A1 | 8/2020 | Foster et al. |

FOREIGN PATENT DOCUMENTS

| | | |
|---|---|---|
| CN | 205378226 | 7/2016 |
| CN | 206523989 | 1/2017 |
| CN | 106781323 | 5/2017 |
| CN | 206651457 | 11/2017 |
| CN | 107948845 A | 4/2018 |
| DE | 10357023 | 7/2005 |
| GB | 2522192 A | 7/2015 |
| KR | 20170027522 | 3/2017 |
| WO | WO2018183036 A1 | 10/2018 |
| WO | WO2019235892 A1 | 12/2019 |

OTHER PUBLICATIONS

Cube; https://cubetracker.com/; last visited Nov. 16, 2020.
Logistimatics; https://logistimatics.com/; last visited Nov. 16, 2020.
Njoiii; https://www.njoiii.com/; last visited Nov. 16, 2020.
Orbit; https://findorbit.com/; last visited Nov. 16, 2020.
Pebblebee; https://pebblebee.com/; last visited Nov. 16, 2020.
Safedome; https://safedome.com/; last visited Nov. 16, 2020.
Samsung SmartThings Tracker; https://www.samsung.com/us/trackers/, last visited Nov. 16, 2020.
Tracki, https://tracki.com/; last visited Nov. 16, 2020.
TrackR, https://www.thetrackr.com/; last visited Nov. 16, 2020.
Thomas, Shane, Written Opinion of the International Search Authority, Form PCT/ISA/237, dated Jan. 19, 2021, 8 Pages, United States.
Thomas, Shane, International Search Report, Form PCT/ISA/210, dated Jan. 19, 2021, 2 Pages, United States.

\* cited by examiner

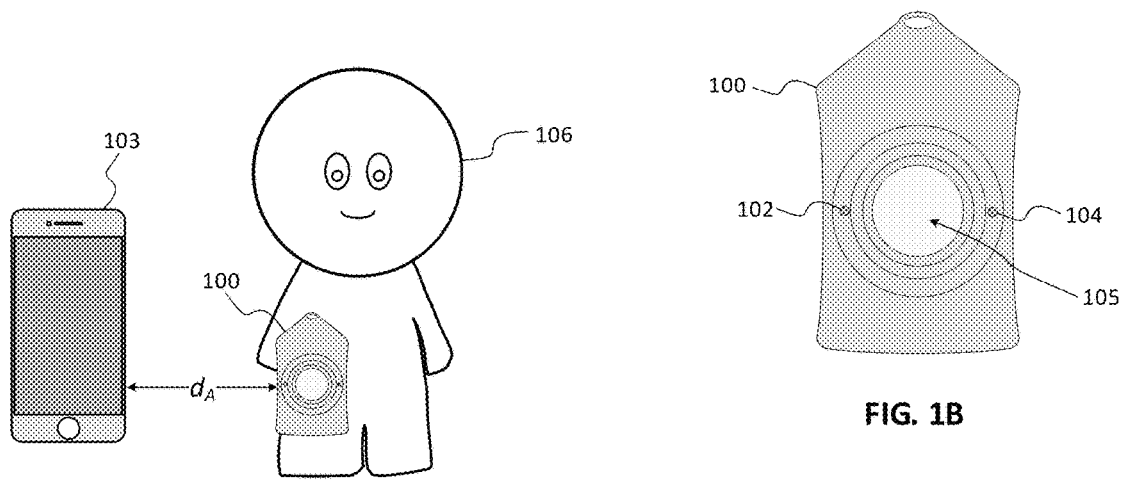
FIG. 1A
FIG. 1B
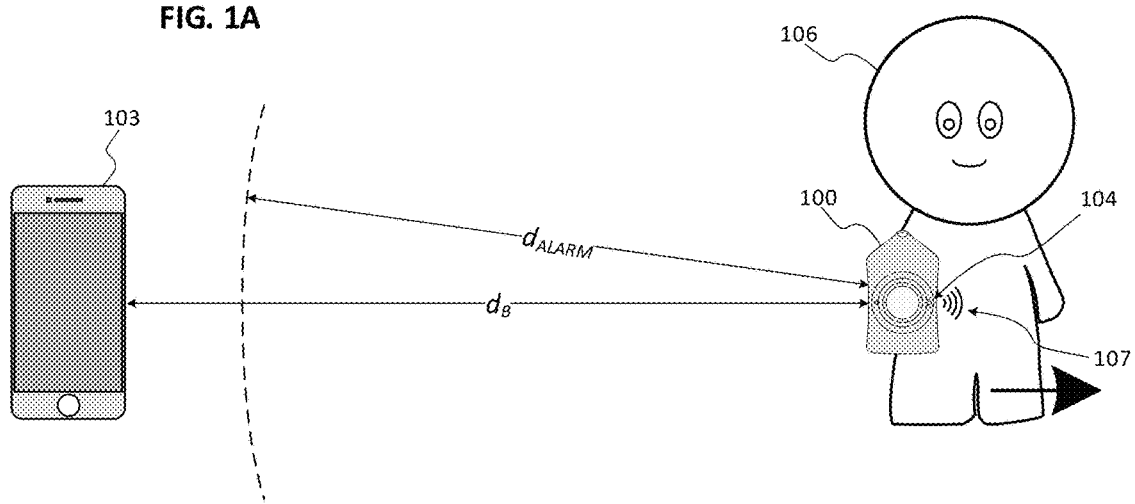
FIG. 1C
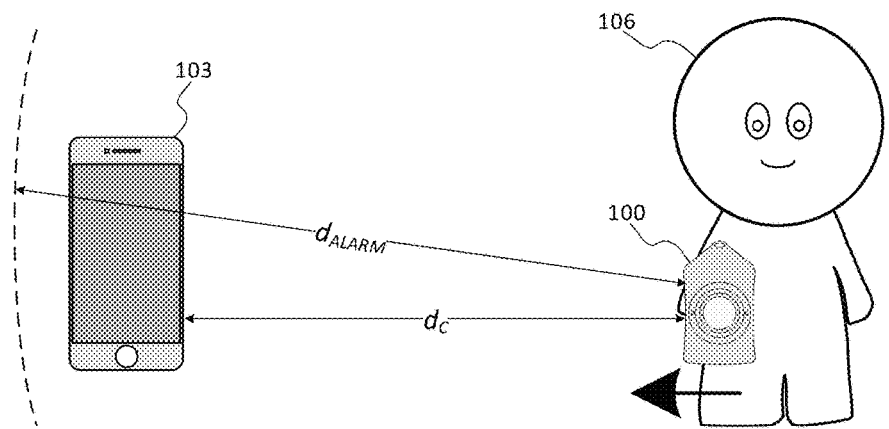
FIG. 1D

PROXIMITY ALERT DEVICE AND METHOD

CROSS-REFERENCE TO RELATED APPLICATIONS

This application claims the benefit of U.S. Patent Application 62/907,069, filed on Sep. 27, 2019, the entire contents of which are incorporated by reference.

SUMMARY

A device and methods are described herein for alerting a user when more than a threshold distance exists between a proximity alert device and a corresponding protected device. The two devices may be coupled by a Bluetooth® connection, and a determination of proximity may be inferred by adjusting a transmission power level associated with the Bluetooth® interface of either of the proximity alert device and the protected device and detecting a loss of connection between previously paired devices. A calibration process or manual adjustment process may be provided to enable a user to tailor a physical distance at which the loss of connection may occur, based on the specific type of protected device and relative arrangement of the protected device and the proximity alert device. The alert provided to the user may prevent loss or theft of the corresponding protected device.

In some implementations, a proximity alert device includes a processor, non-volatile memory, a user input device, and a Bluetooth® transceiver. The processor may execute instructions to perform a method of alerting a user when more than a threshold distance is inferred to exist between the proximity alert device and a protected device. The method may include loading a first configuration value from the non-volatile memory and setting a transmission power level of the Bluetooth® transceiver (in some implementations, a Bluetooth® Low Energy (BLE) transceiver), based on the loaded first configuration value, to a first power level. The first power level may be selected from among a plurality of possible power levels. In some implementations, the possible power levels may include +4 dBm, 0 dBm, −4 dBm, −8 dBm, −12 dBm, −16 dBm, and −20 dBm.

The method may further include advertising for a pairing and subsequently pairing and/or bonding with a protected device that also has a Bluetooth® transceiver. The pairing and/or bonding may occur via a Human Interface Device Profile (HID) over Generic Attributes Profile (GATT) profile (HOGP).

Upon pairing and/or bonding with the protected device, the method may include loading a second configuration value from the non-volatile memory and setting the transmission power level to a second power level that is less than the first power level. In some implementations, the second power level is greater than the first power level.

The method may further include receiving input from the user input device to calibrate the threshold distance. In some implementations, in response to receiving the input, the method may include retrieving at least one value for a received signal strength indicator (RSSI) associated with the paired protected device, and based on a comparison of the at least one value to a stored reference value, increasing the transmission power level by a predetermined increment if the at least one value is less than the stored reference value by more than a first threshold, and decreasing the transmission power level by at predetermined increment if the at least one value is greater than the stored reference value by more than a second threshold. In some implementations, the predetermined increment is 1 dBm, 2 dBm or 4 dBm. The increased or decreased transmission power level may be saved to non-volatile memory as a calibrated power level.

The method may further include detecting a loss of connection with the paired protected device. In some implementations, in response to detecting the loss of connection, the method may further include triggering an alarm and decreasing the transmission power level relative to the calibrated power level. In some implementations, upon restoration of a connection with the paired protected device, the method may include restoring the transmission power level to the calibrated power level.

In some implementations, a proximity alert device includes a processor, non-volatile memory, a user input device, and a Bluetooth® transceiver. The processor may execute program instructions that perform a method of alerting a user when more than a threshold distance is inferred to exist between the proximity alert device and a protected device. The method may include loading a first configuration value from the non-volatile memory and setting a transmission power level of the Bluetooth® transceiver, based on the loaded first configuration value, to a first power level from among a plurality of possible power levels.

The method may further include advertising for, via a Bluetooth® protocol, a pairing, and subsequently pairing with a protected device that also has a Bluetooth® transceiver. In some implementations, the pairing may be via a Human Interface Device Profile (HID) over Generic Attributes Profile (GATT) profile (HOGP). The pairing may include bonding, wherein an identifier associated with the protected device or the proximity alert device is stored in a whitelist.

The method may further include receiving input from the user input device to calibrate the threshold distance. In some implementations, in response to receiving the input, the method may include retrieving at least one value for a received signal strength indicator (RSSI) associated with the paired protected device, and based on a comparison of the at least one value to a stored reference value, adjusting the transmission power level of the Bluetooth® transceiver up or down. The method may further include saving to the non-volatile memory the adjusted transmission power level as a calibrated power level.

The method may further include detecting a loss of connection with the paired protected device. In some implementations, in response to detecting the loss of connection, the method may include triggering an alarm. Triggering an alarm may include providing a visual indication, providing an audible tone or providing haptic feedback.

Setting a transmission power level may include configuring the gain of a power amplifier in the Bluetooth® transceiver. In some implementations, the plurality of possible power levels includes +4 dBm, +3 dBm, 0 dBm, −4 dBm, −8 dBm, −12 dBm, −16 dBm and −20 dBm. In other implementations, the plurality of possible power levels includes +4 dBm, 0 dBm, −4 dBm, −8 dBm, −12 dBm, −16 dBm, −20 dBm and −40 dBm. In some implementations, the first power level may be selected from among 0 dBM, −4 dBm, −8 dBm and −12 dBm.

In some implementations, the method may further include, upon pairing with the protected device, loading a second configuration value from the non-volatile memory and setting a transmission power level of the Bluetooth® transceiver, based on the loaded second configuration value, to a second power level. The second power level may be lower or higher than the first power level. In some implementations, the first power level may be selected from among −8 dBm, −12 dBm and −16 dBm; and the second power level may be selected from among −12 dBm, −16 dBm and −20 dBm.

Adjusting the transmission power level may include increasing the transmission power level if the at least one value is less than the stored reference value by more than a first threshold, and decreasing the transmission power level if the at least one value is greater than the stored reference value by more than a second threshold.

The method may further include periodically sending data, via the Bluetooth® protocol, to the paired protected device. Detecting a loss of connection may include determining that a response from the pair protected device has not been received in response to the periodically sent data.

The method may further include decreasing the transmission power level of the Bluetooth® transceiver relative to the calibrated power level when triggering the alarm. Upon restoration of a connection with the paired protected device, the method may further include restoring the transmission power level to the calibrated power level.

In some implementations, a proximity alert device includes a processor, non-volatile memory, a user input device, a radio transceiver, and primary memory that stores program instructions to be executed by the processor. The program instructions may include instructions that, when executed, perform a method that includes loading a configuration value from the non-volatile memory and setting a transmission power level of the radio transceiver, based on the loaded first configuration value, to a configuration power level from among a plurality of possible power levels.

The method may further include advertising for a pairing and subsequently pairing with a protected device that has a corresponding radio transceiver. In some implementations, pairing may include pairing via a Human Interface Device Profile (HID) over Generic Attributes Profile (GATT) profile (HOGP) Bluetooth® protocol.

In some implementations, the method may further include, upon pairing with the protected device, loading a second configuration value from the non-volatile memory and setting the transmission power level, based on the loaded second configuration value, to a second power level that is lower than the first power level. In some implementations, the second power level is greater than the first power level.

The method may further include receiving input from the user input device to adjust the transmission power level up or down by a predetermined increment. In some implementations, receiving input from the user device may include receiving a first command to adjust the transmission power up or receiving a second command that is different than the first command to adjust the transmission power down. In some implementations, in response to receiving the input, the method may include adjusting the transmission power level of the radio transceiver up or down by the predetermined increment, based on the received input. The method may further include saving to the non-volatile memory the adjusted transmission power level as a calibrated power level.

The method may further include detecting a loss of connection with the paired protected device. The method may further include, in response to detecting the loss of connection, triggering an alarm.

BRIEF DESCRIPTION OF THE DRAWINGS

FIG. 1A illustrates an exemplary proximity alert device and a protected device.

FIG. 1B illustrates additional detail of an exemplary proximity alert device.

FIG. 1C illustrates an exemplary proximity alert device and a protected device.

FIG. 1D illustrates an exemplary proximity alert device and a protected device.

DETAILED DESCRIPTION

Figure 2:
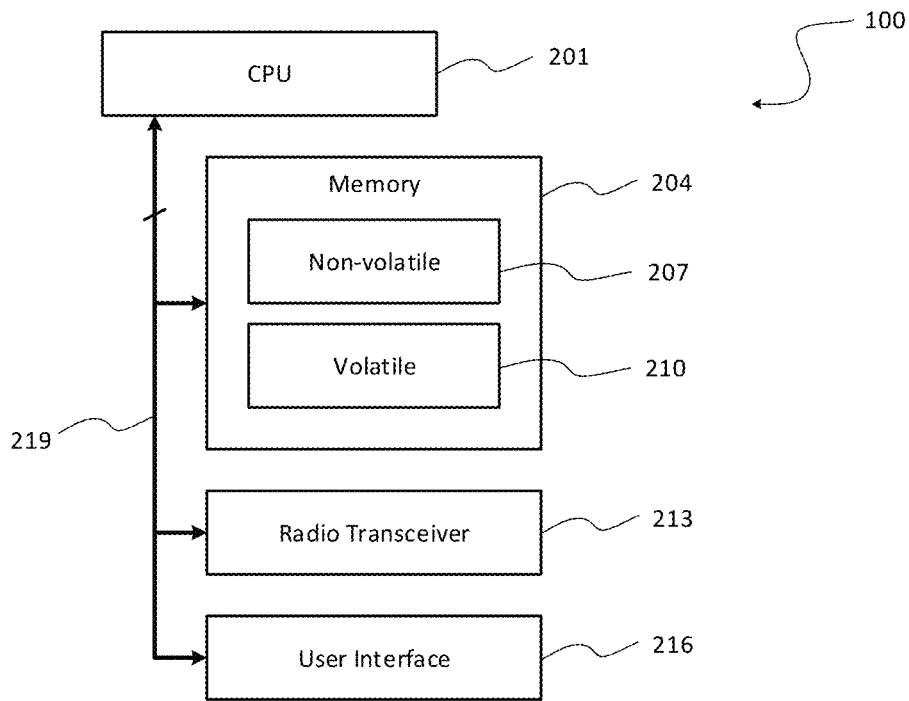
FIG. 2 is a block diagram of an exemplary proximity alert device.

FIG. 1A illustrates an exemplary proximity alert device 100 and a protected device 103 that may be employed by a user 106. In the implementation shown, the user 106 carries the proximity alert device 100 on or about his or her person and near the protected device 103. As shown in FIG. 1A, the proximity alert device 100 and the protected device 103 are physically separated by a distance $d_A$.

As is described herein, the proximity alert device 100 can alert the user 106 if more than a threshold distance is detected or inferred between the proximity alert device 100 and the protected device 103. Thus, the proximity alert device 100 can assist the user 106 in preventing the loss of the protected device 103. For example, if the user 106 walks away from the protected device 103, the proximity alert device 103 can alert the user 106 before he or she gets too far away to retrieve the protected device 103.

In this description and in the corresponding figures, the protected device 103 is depicted as a mobile communication device. The reader will appreciate that the protected device 103 could be any other device with a radio transceiver (e.g., a Bluetooth® transceiver) as described herein, such as, for example, a laptop or notebook computer or tablet, a fitness accessory, an appliance, electronic equipment, etc. Similarly, in some figures, the proximity alert device 100 is depicted as a portable fob that could, for example, be affixed to a key ring or carried in a pocket. In other figures, the proximity alert device is depicted as a thin, application-less device in the form factor of an ID badge or credit card. The reader will appreciate that the proximity alert device 100 could be included in another mobile communication device, a laptop or notebook computer or tablet, a fitness accessory, an appliance, electronic equipment, etc.; and its form factor could be a fob, a card, a bracelet, a watch, a clothing or personal accessory, etc.

FIG. 1B illustrates additional detail of an exemplary proximity alert device 100. As shown in one implementation, the proximity alert device 100 includes indicators 102 and 104, and a pushbutton 105. In some implementations, indicators 102 and 104 provide a visual indication of functionality. For example, indicator 102 could momentarily indicate a power-on condition and/or that a communication link has been established with a corresponding protected device, such as device 103. Indicator 104 could indicate a power-off condition and/or an indication that a communication link has been lost with a corresponding protected device, such as device 103. The proximity alert device 100 may receive user input via the pushbutton 105. The proximity alert device 100 may include other user interface features (not shown), such as haptic (e.g., vibration) or audible feedback (e.g., a tone produced, by, for example, a piezo element).

FIG. 1C illustrates an exemplary proximity alert device 100 and a protected device 103 that are separated by a distance $d_B$ that is greater than an alarm distance $d_{ALARM}$. As depicted in this implementation, the proximity alert device 100 can alert the user 106 of the physical separation between the proximity alert device 100 and the protected device 103. ("Alarm" and "alert" are used herein interchangeably to refer to signaling a user of a loss of connection, and by inference or extension, a physical separation between the proximity alert device 100 and the protected device 103 exceeding a threshold distance.) By promptly alerting the user 106 of this condition, the user 106 may be able to retrace his or her steps to retrieve the protected device 103, prior to losing track of the protected device 103. Users may employ the proximity alert device 100 to prevent loss or theft of the protected device 103, such as, for example, in public places such as a restaurants, libraries or other meeting places, where a protected device 103 might be inadvertently set down and forgotten, be covered or obscured by other objects in the user's environment, or be stolen.

In some implementations, the specific manner in which the proximity alert device 100 alerts the user 106 may include flashing an indicator, such as indicator 104, or generating a tone and/or haptic feedback (depicted by 107).

FIG. 1D illustrates an exemplary proximity alert device and a protected device that have returned to within a distance $d_C$ that is less than the $d_{ALARM}$ threshold distance. In this example, any alarm or indication (such as a flashing indicator 104 or audible or haptic feedback 107) can be discontinued, and the connection between the proximity alert device 100 and the protected device 103 can be restored in the manner described in this description.

In FIG. 1C, the user 106 is depicted as moving away from the protected device 103, with the proximity alert device 100 on his or her person; in FIG. 1D, the user 106 is depicted as moving toward the protected device 103, with the proximity alert device 100 on his or her person. The reader will appreciate that the principles described herein apply regardless of whether the proximity alert device 100 is moving away from the protected device 103, or whether the protected device 103 is moving away from the proximity alert device 100. Thus, for example, an alert could be generated in a scenario in which the user 106 (with the proximity alert device 100 on his or her person) is stationary (e.g., at a restaurant or library table), and the protected device 103 is moved away from the proximity alert device 100, beyond a distance of $d_{ALARM}$ (e.g., in the case of an attempted theft of the protected device 103).

FIG. 2 is a block diagram of an exemplary proximity alert device 100. As shown in one implementation, the proximity alert device 100 can include electronics to implement the functions described, including a CPU 201, memory 204, a radio transceiver 213, and user interface functionality 216. The aforementioned components may be coupled in a traditional manner with a bus 219, and the system may be provided with suitable power (not shown), such as, for example, a battery that is appropriately sized and rated for the desired form factor and operating life. For example, some implementations may employ a coin cell; other implementations may employ a rechargeable power store.

The memory 204 may include both non-volatile memory 207 (memory that does not lose its data when power is not applied) and volatile memory 210 (memory that requires power to store and retain data). Non-volatile memory 207 and volatile memory 210 may take various forms. For example, non-volatile memory 207 may include one-time programmable (OTP) memory, non-volatile read-only memory (NVROM), erasable programmable read-only memory (EPROM), electrically erasable programmable read-only memory (EEPROM), or other similar memory. Volatile memory may include one or more forms of dynamic random-access memory (DRAM) or cache memory. In some implementations, volatile memory is faster than non-volatile memory; and in such implementations, program code that is executed by the system's CPU 201 may be loaded from a non-volatile memory 207 to a volatile memory 210 upon power-up of the system.

The user interface 216 may include various functional components that facilitate receiving user input (e.g., a pushbutton, such as pushbutton 105) or providing output in a user-discernable form, such as visual indications in the form of flashing lights (e.g., via light emitting diodes (LEDs) or other indicators, such as the indicators 102 and 104), or haptic or tonal feedback (e.g., feedback 107). The reader will appreciate that the user interface 216 may include other devices, such as displays, touch sensors, vibration sensors, accelerometers, sensors that detect gestures, heads-up displays, etc.

In some implementations, the radio transceiver 213 implements a communication protocol for forming ad hoc networks between devices. As an example, the transceiver 213 may be configured to form a Bluetooth® piconet between the proximity alert device 100 and a protected device 103. Additional details of an exemplary radio transceiver 213 are provided with reference to FIG. 3.

Figure 3:
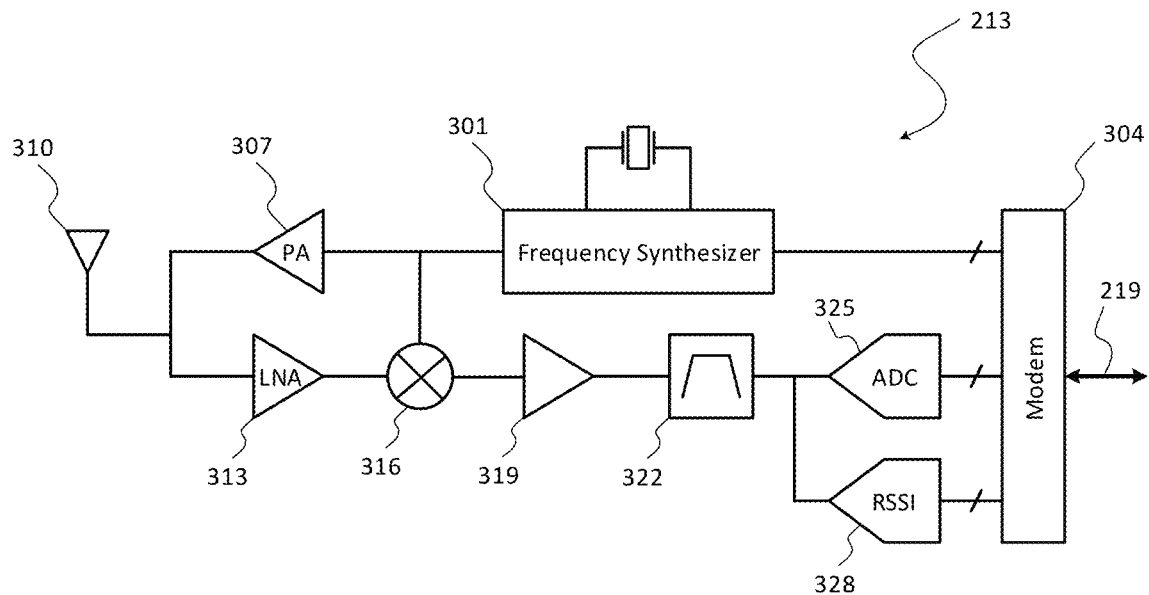
FIG. 3 is a schematic of an exemplary radio transceiver in a proximity alert device.

FIG. 3 is a schematic of an exemplary radio transceiver 213 in a proximity alert device 100. In the implementation illustrated, the radio transceiver 213 includes a frequency synthesizer 301 for generating radio waves of appropriate frequencies. The frequency synthesizer 301 may modulate data received via a modem 304, from a bus 219 that is associated with the system described with respect to FIG. 2. Data that is modulated by the frequency synthesizer 301 may be amplified by a power amplifier 307 and transmitted over the air via an antenna 310.

The antenna 310 may also receive radio signals; amplify them with a low-noise amplifier 313; and filter them with filter 319, mixer 316 and a reference signal provided by the frequency synthesizer 301, to generate an information signal 322. This signal 322 may be further processed, such as with an analog-to-digital decoder (ADC) 325.

In some implementations, the information signal 322 includes meta-information about a received signal, such as, for example, a signal strength associated with the received signal. Such meta-information may be extracted by an RSSI (received signal strength indicator) block 328 and relayed via the modem 304 to the bus 219 in digital form for processing by the overall system described with reference to FIG. 2.

In preferred implementations, RSSI information is not directly used to generate alerts that flag a greater-than-threshold distance between a proximity alert device 100 and a protected device 103; rather, transmission power levels are modulated by the power amplifier 307 to configure a distance over which a connection can be maintained between a proximity alert device 100 and a protected device 103. An exemplary method of modulating transmission power level is now described with reference to FIG. 4.

Figure 4:
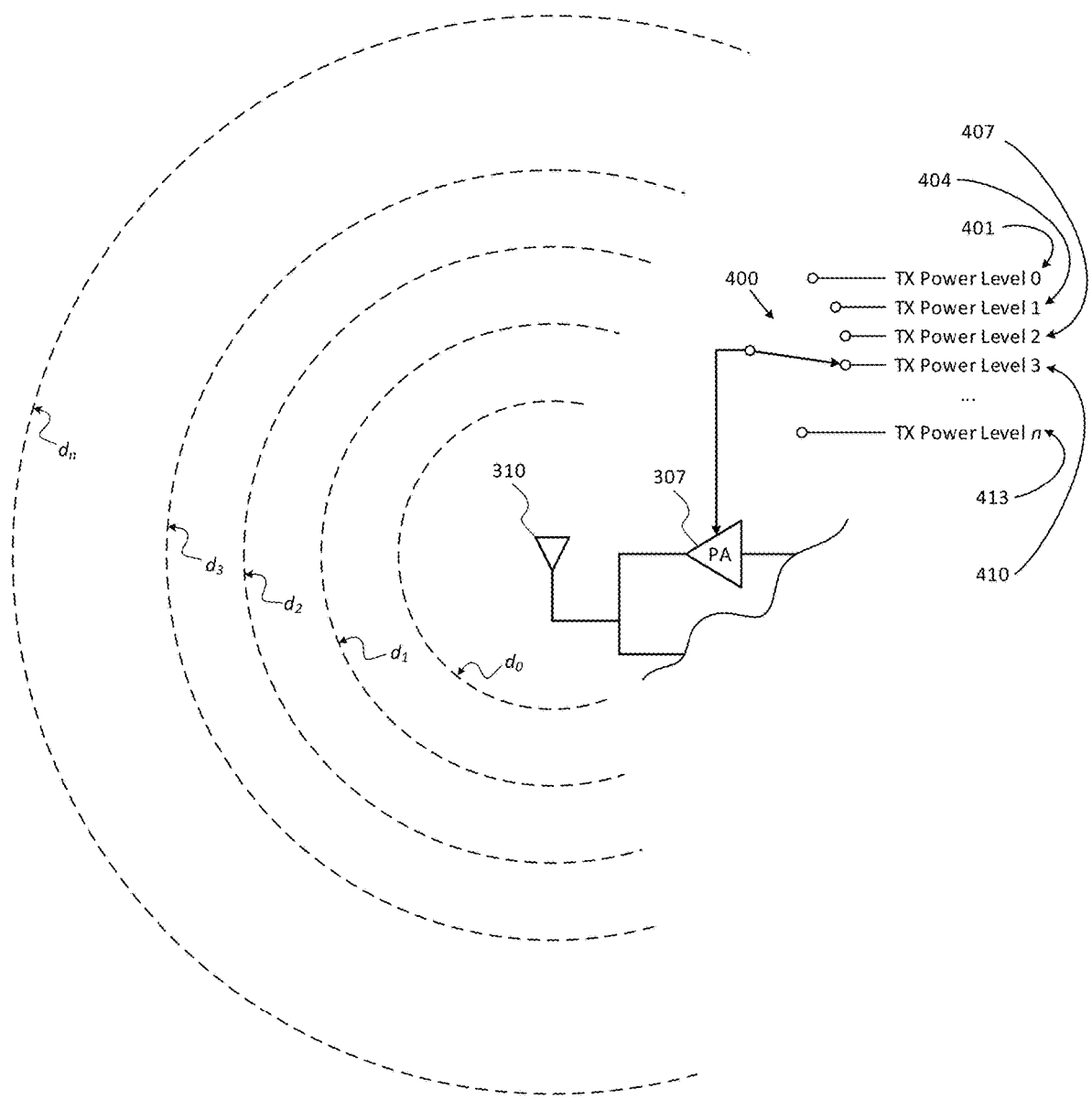
FIG. 4 illustrates additional detail of an exemplary radio transceiver.

FIG. 4 illustrates additional detail of an exemplary radio transceiver 213. Specifically, the power amplifier 307 may be configurable to amplify a received signal for transmission via the antenna 310 at one of a plurality of different power levels (e.g., gains). For example, in one implementation, a selector 400 selects among a plurality of different amplification levels, or power levels, at which a signal at the power amplifier 307 amplifies an incoming signal. The various power levels may correspond to a peak current at which the power amplifier 307 drives a signal to the antenna 310. In some implementations, the power levels range from low to high single-digit milliamps (mA), or low single-digit milliamps to low double-digit milliamps—such as, in one example, 2.2 mA to 9.9 mA; or in another example, 4.1 mA to 14.8 mA. The various power levels may be specified in other units—such as, for example, decibel-milliwatts (dBm). In one implementation, the power levels range between −33.5 dBm and 6.2 dBm. In another implementation, the power levels range between −40 dBm and +4 dBm. The various power levels may also be specified in units of distance, such as meters (m) or feet (ft) over which a connection can be reliably made, in a typical environment that is free of significant radio wave interference or obstructions. In some implementations, the power levels correspond to distances of <1 m to more than 50 m, or less than 1 ft to more than 100 ft.

In some implementations, there may be three different power levels, and the proximity alert device 100 may be configured to employ the middle power level. In other implementations, there may be many more different power levels, such as, for example, four, eight, sixteen, eighteen, thirty-two, etc.; and the proximity alert device 100 may be configured to employ an intermediate power level, such as, for example, power level 9 in a system that has 18 power levels between 0 and 17.

Although the selector 400 is depicted as a mechanical switch, the reader will appreciate that this selector 400 may be implemented electronically, such as, for example, by a control bit in a configuration register that is written by computer code executed by the CPU 201. This bit may be written, or the power level configured, in an initial power-up sequence.

Regardless of how the power levels are specified in various implementations, different power levels correspond to different distances over which a reliable connection can be made. For example, a TX Power Level 0 (401) may correspond to a distance do over which a proximity alert device 100 and a protected device 103 can be reliably connected; a TX Power Level 1 (404) may correspond to a distance $d_1$; a TX Power Level 2 (407) may correspond to a distance $d_2$; a TX Power Level 3 (410) may correspond to a distance $d_3$; a TX Power Level n (413) may correspond to a distance $d_n$; and so on. Thus, through selection by the selector 400 of the power level of the power amplifier 307, a distance can be configured over which a connection can be maintained between a proximity alert device 100 and a protected device 103.

Figure 5:
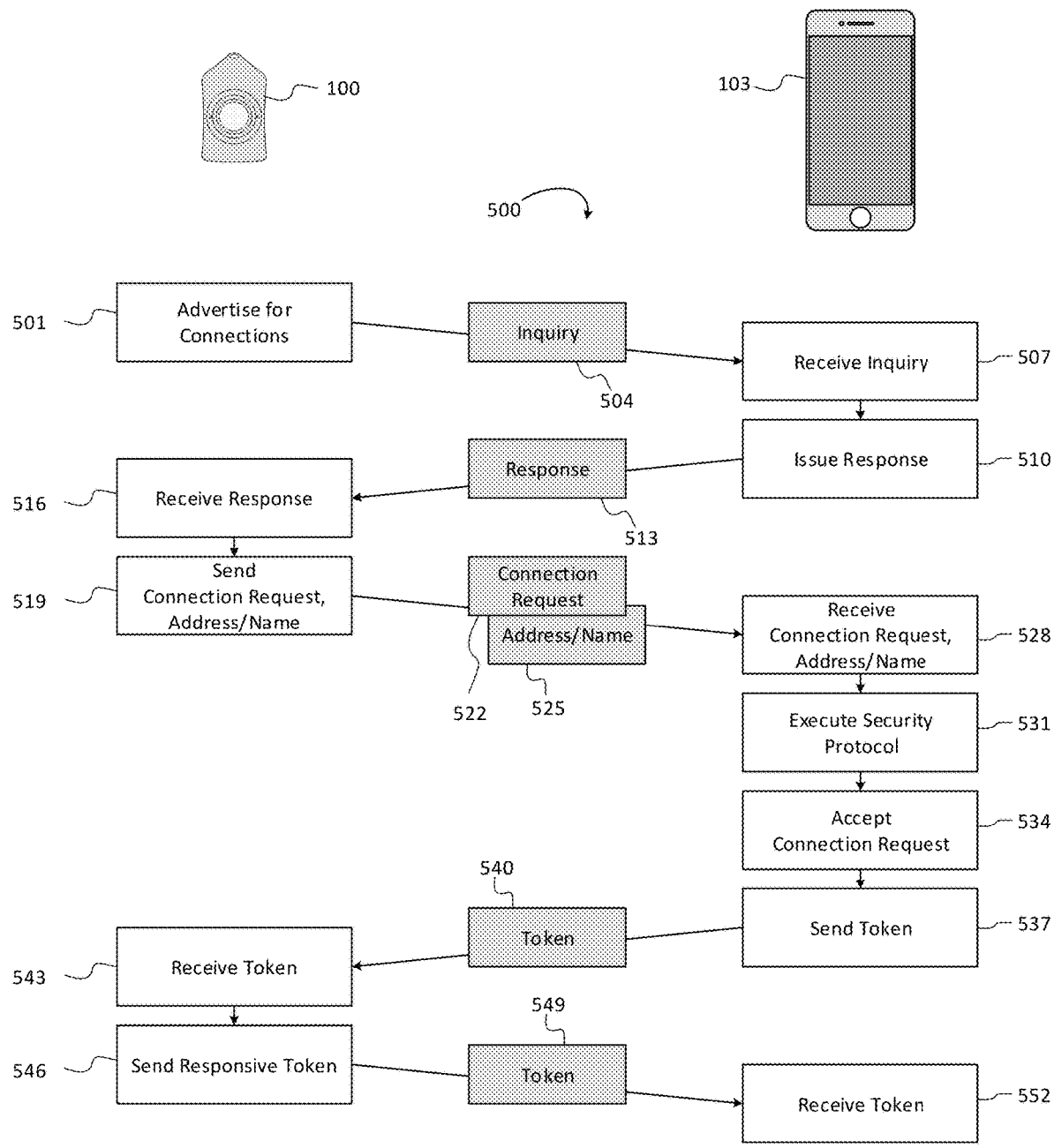
FIG. 5 is a swim-lane diagram illustrating an exemplary method of pairing a proximity alert device and a protected device.

FIG. 5 is a swim-lane diagram illustrating an exemplary method 500 of pairing a proximity alert device 100 and a protected device 103. This exemplary method outlines conceptually how connections are made between two devices over a Bluetooth® interface. As depicted, a device advertises (501) to potentially local devices that may be available for connection through an ad hoc piconet. In the example depicted, the proximity alert device 100 is the device advertising (501) for connections. To advertise for such connections, the proximity alert device 100 sends out an inquiry 504. A physically proximate device that is open to receiving such inquiries, such as the protected device 103, may receive (507) the inquiry 504, and it may issue (510) its own response 513. The proximity alert device 100 receives (516) this response 513 and transmits additional information—such as a connection request 522 and its own address and/or name 525. The protected device 103 receives (528) this connection request 522 and address/name 525 and may execute a security protocol (531). In some implementations, this security protocol involves user action—such as input that explicitly authorizes the connection. Upon execution (531) of any security protocol, the protected device accepts (534) the connection request.

In the implementation depicted, in order to facilitate a persistent connection (e.g., through disconnects and power interruptions), the protected device 103 sends (537) a token 540, such as a passkey, cipher or cryptographic authentication file. The proximity alert device 100 receives (543) the token 540 and sends (546) its own responsive token 549, which the protected device 103 receives (552). With the devices 100 and 103 having now exchanged tokens, a trusted communication channel is established, and this channel may be reestablished in the event of a disconnect or power cycle. In some implementations, the successful exchange of tokens may be recorded by an entry on a whitelist (e.g., an entry of an identifier associated with either the proximity alert device 100 or the protected device 103).

Figure 6:
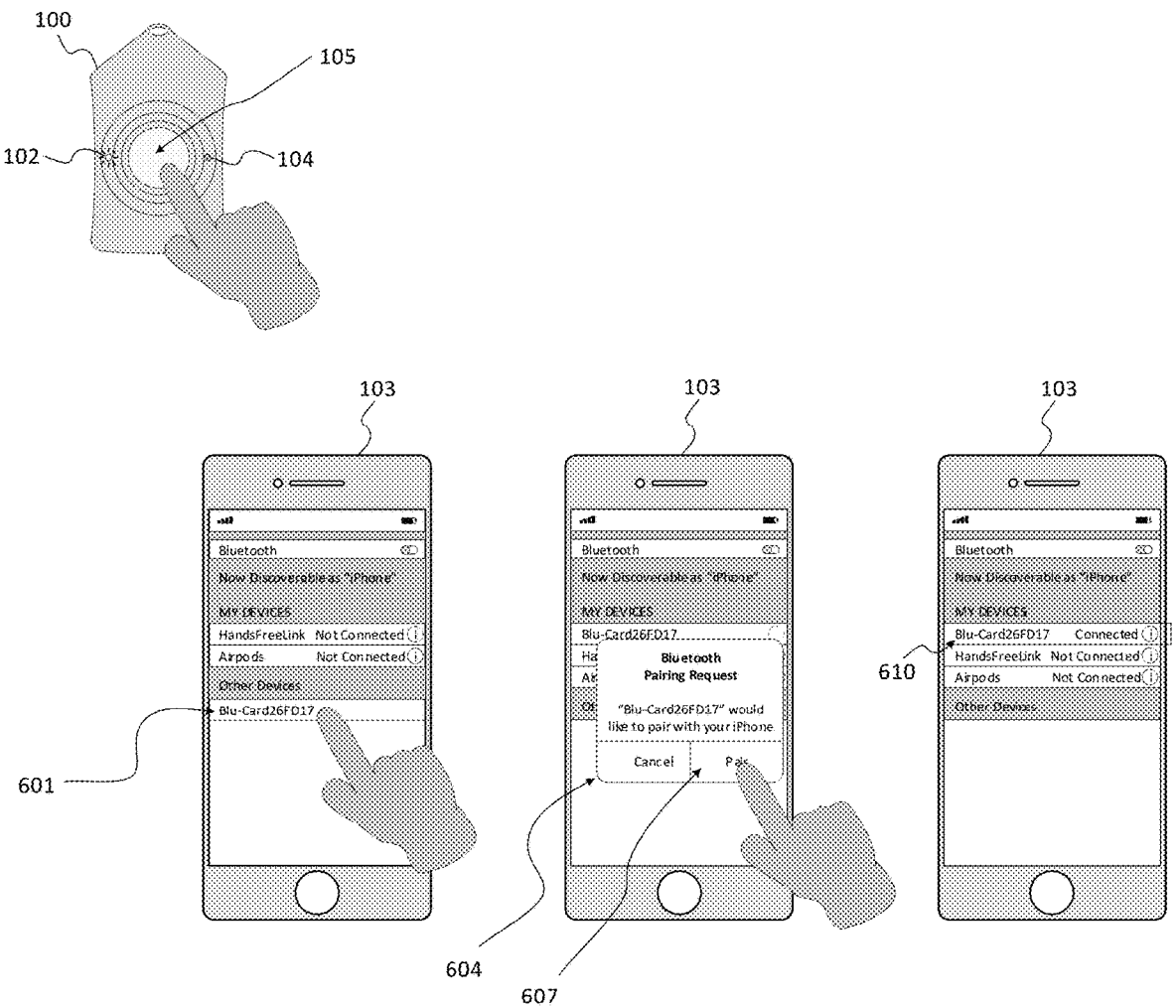
FIG. 6 illustrates additional detail of an exemplary method of pairing a proximity alert device and a protected device.

FIG. 6 illustrates additional graphical detail of an exemplary method illustrated and described with reference to FIG. 5. In the implementation depicted, both devices are switched on. For the proximity alert device 100, this may involve user actuation of the pushbutton 105, as shown. Feedback may be provided that the device 100 has been activated, such as, for example, through temporary illumination of the indicator 102. Similarly, the protected device 103 is powered on and configured to receive connections from other devices. In the implementation shown, this involves activating a Bluetooth® interface to enable pairing with other Bluetooth® devices. As shown, the protected device 103 has detected a device that is available for pairing—in this case, "Blu-Card26FD17"—and has so indicated this with indication 601.

In some implementations, and with reference to the steps depicted in FIG. 5, in order for the protected device 103 to provide the indication 601 that the proximity alert device 100 is available for pairing, that proximity alert device 100 may have advertised for connections (501) by sending an inquiry 504; the protected device 103 may have received (507) that inquiry and issued (510) its own response 513; the proximity alert device 100 may have received (516) that response and sent (519) a connection request 522 and a name/address 525 corresponding to the proximity alert device 100 (in this case, "Blu-Card26FD17," with other address information that is not illustrated). Upon receiving (528) the connection request 522 and name/address 525, the protected device 103 may display the indication 601.

In some implementations, including the one depicted, user selection of the indication 601 causes a security protocol to be executed (531). More particularly, a user interface window 604 may appear on the protected device 103, soliciting user confirmation of a desired pairing between the protected device 103 and the proximity alert device 100. A user may provide this input by selecting the "pair" confirmation 607.

Internal to the protected device 103 and the proximity alert device 100, selection of the "pair" confirmation 607 may cause the connection request to be accepted (534) and for a token 540 to be sent (537) by the protected device 103; and for the proximity alert device 100 to receive (543) the token 540 and send (546) a responsive token 549. Upon receipt (552) of the responsive token 549, a connection may be established between the devices 100 and 103, and this connection may be confirmed through display of the message 610, showing the name of the proximity alert device 103 ("Blu-Card26FD17") and the fact that this device is "Connected."

Described with reference to FIG. 6 is a pairing process involving an application running on the protected device. In other implementations, such as those described with reference to FIGS. 10-12, the pairing process may proceed without an application.

Figure 7A:
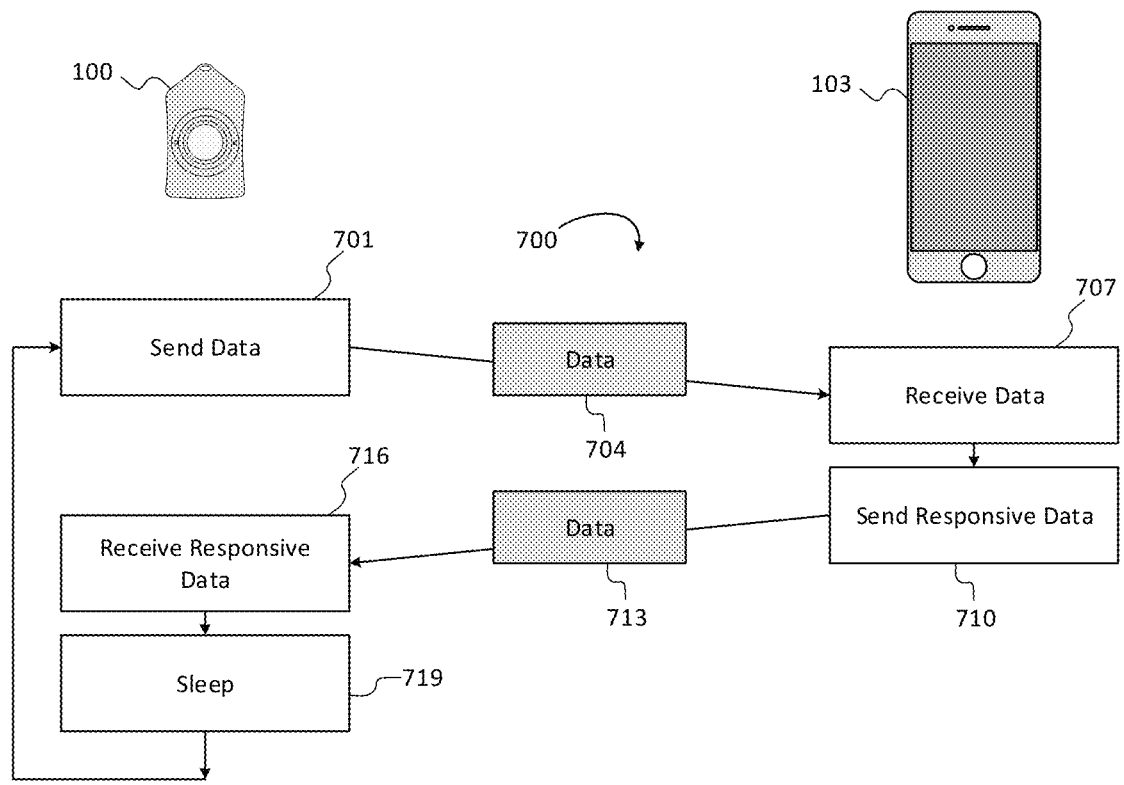
FIG. 7A is a swim-lane diagram illustrating an exemplary method of confirming a connection between a proximity alert device and a protected device.

FIG. 7A is a swim-lane diagram illustrating an exemplary method 700 for confirming persistence of a connection between the proximity alert device 100 and the protected device 103 that has already been established, such as, for example, through the exemplary method 500. In this exemplary method 700, the proximity alert device 100 periodically sends (701) data 704 to the protected device 103. The protected device 103 receives (707) this data 704 and sends (710) responsive data 713. Upon receiving (716) the responsive data 713, the proximity alert device 100 may enter (719) a low-power sleep mode, and subsequently repeat steps 701, 716 and 719 after a delay.

In this manner, the proximity alert device 100 can periodically confirm persistence of the connection with the protected device 103, without consuming substantial power to do so. In some implementations, steps 701, 716 and 719 may be repeated every 7.5 mS; in other implementations, steps 701, 716 and 719 may be repeated every 20 mS; in other implementations, steps 701, 716 and 719 may be repeated every 4-10.24 seconds; in other implementations, the steps 701, 716 and 719 may be repeated within ranges between or outside of the aforementioned points.

In preferred implementations, the period at which persistence of the connection is confirmed is set to balance power consumption against a time that is short enough to detect the loss of a connection, such that a user can take action after being alerted of the loss of connection (and the greater-than-threshold distance between the proximity alert device 100 and protected device 103 that that loss of connection indicates).

Power may be substantially conserved when the proximity alert device 100 is in a low-power sleep mode represented by step 719. For example, most power consumed by the proximity alert device 100 may be consumed by the process of the device 100 waking up (the transition from step 719 to step 701), and the steps of sending (701) data 704 and receiving (716) responsive data 713.

Figure 7B:
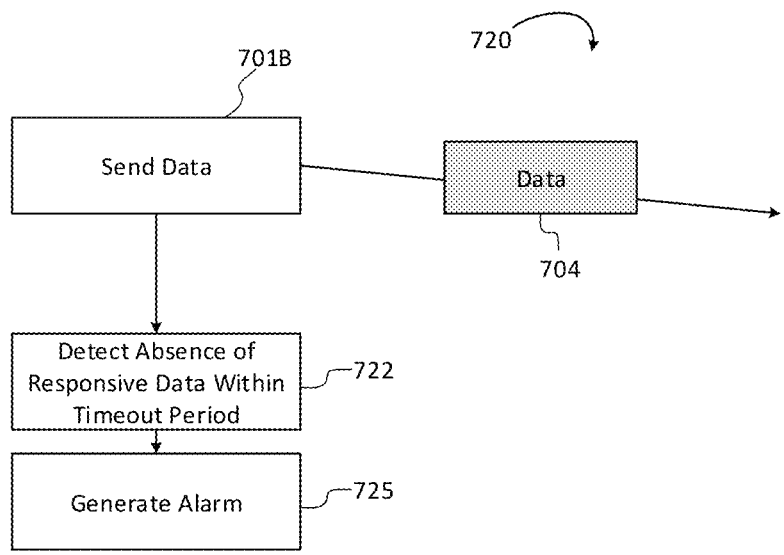
FIG. 7B is a swim-lane diagram illustrating an exemplary method of generating an alarm when a physical separation greater than a threshold distance exists between a proximity alert device and a protected device.

FIG. 7B is a swim-lane diagram illustrating an exemplary method 720 of indicating, with an alarm, a physical separation between the proximity alert device 100 and the protected device 103 that is greater than a threshold distance. In this exemplary method 720, the proximity alert device 100 sends (701B) data 704, as it did in method 700. However, as depicted here, the protected device 103 is no longer connected. This could be, for example, with reference to FIG. 1C, because the distance $d_B$ between the protected device 103 and the proximity alert device 100 exceeds the distance $d_{ALARM}$ over which a reliable connection is possible. This may have resulted because a user 106 inadvertently left his or her protected device 103 and walked away with the proximity alert device 100 on his or her person, as depicted in FIG. 1C.

The distance $d_{ALARM}$ may have been established by, with reference to FIG. 4, the power level set by the selector 400. That is, the selector 400 may cause the power amplifier 307 to be driven at a transmission power level that is an intermediate power level, within a plurality of possible power levels. For example, in some implementations, there are eighteen possible power levels (e.g., levels 0 through 17), and the power level may be set to 9. In such implementations, such a power level may correspond to a transmission power of, for example, 3.6 mA, 6.9 mA, or −6.9 dBm; and the power level may result in a reliable connection being formed in the 1-3 m range (3-15 feet).

In some implementations, the method 720 is configured such that the proximity alert device 100 detects (722) the absence of return data with a threshold period of time. The proximity alert device 100 may be programmed, for example, to start a timer upon sending (710B) the data 704. If the timer reaches a threshold period of time (e.g., a period by which responsive data would be expected if a connection were established with the protected device 103, including any retries that would be issued by a low-level physical layer of the corresponding communication protocol), an alarm can be generated (725). The alarm could be in the form of an audible tone, haptic feedback, a visual indicator, some combination of these, or some other action that would provide an alert to a corresponding user.

Figure 8:
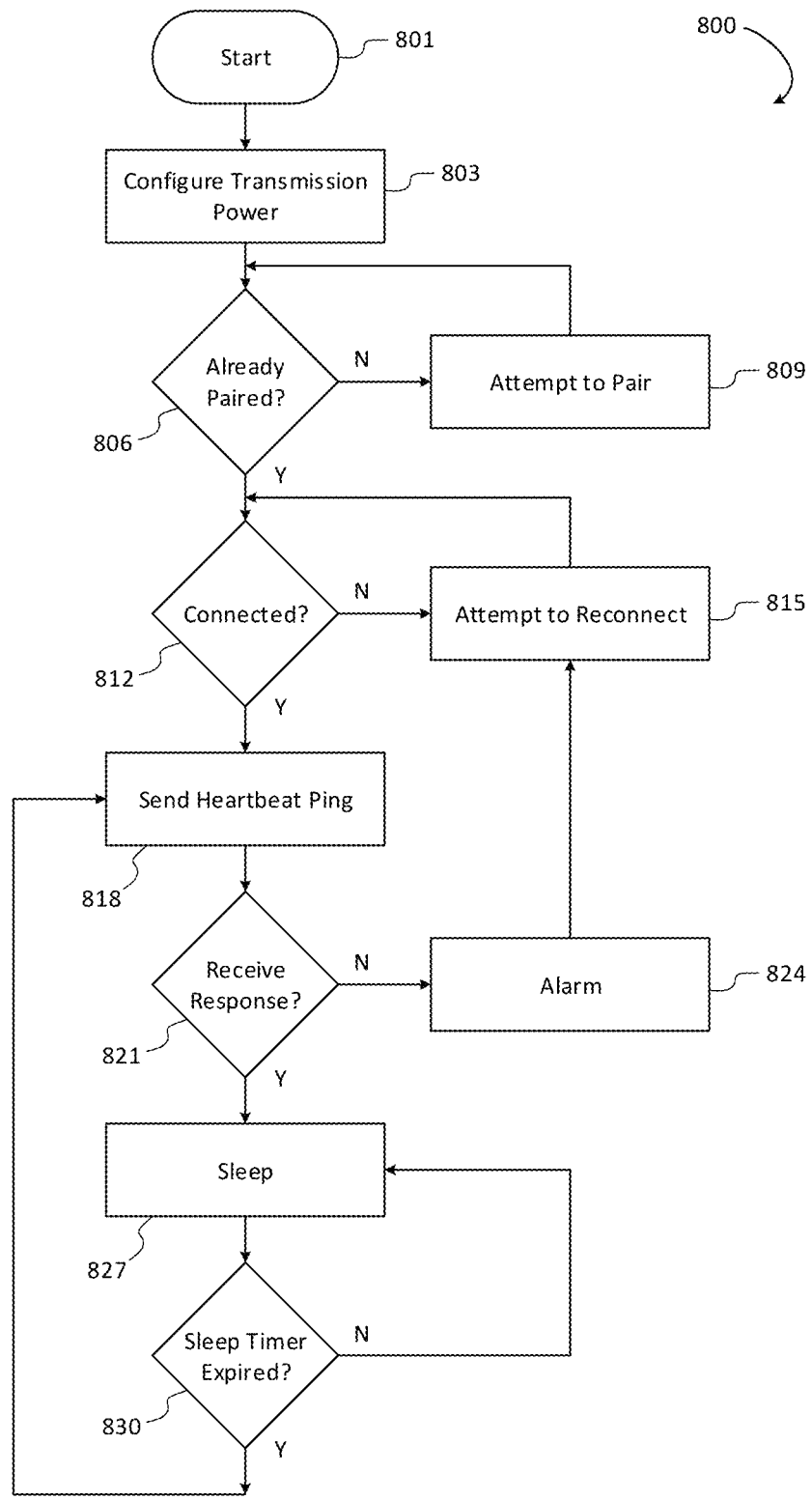
FIG. 8 is a flow diagram of an exemplary method of alarming a condition in which a proximity alert device and a protected device are separated by a physical distance that is greater than a threshold distance.

FIG. 8 is a flow diagram of an exemplary method 800 of alarming a condition in which a proximity alert device 100 and a protected device 103 are separated by a physical distance that is greater than a threshold distance (e.g., the distance $d_{ALARM}$ depicted in FIG. 1C).

When the method 800 starts (801), transmission power is configured (803). With reference to FIG. 2, configuration settings could be read from non-volatile memory 207 into a configuration setting in the radio transceiver 213; more particularly, such configuration settings could set the selector 400, shown in FIG. 4, to configure the transmission power (e.g., amplification level or gain of power amplifier 307).

Next, a determination is made (806) as to whether the proximity alert device 100 is already paired to a protected device 103; if not, an attempt can be made (809) to pair. In some implementations, with reference to FIG. 5, the determination 806 involves determining whether a token 540 has previously been received and stored for a related protected device 103. If the proximity alert device 100 has not been previously paired, the method 500 may be implemented to make a pairing.

If a pairing has been previously made, some implementations determine (812) whether a connection is active. This may involve, with reference to FIG. 7A, an exchange of data 704 and 713. The method 800 may implement a similar exchange of data following an initial connection by sending (818) a "heartbeat ping"—e.g., a periodic exchange of data (such as the above-described exchange of data 704 and 713). A determination can be made (821) as to whether or not a response is received in a timely manner; if not, an alarm can be triggered (824), and an attempt can be made (815) to reestablish a connection; if a response is timely received, then the proximity alert device 100 may enter a low-power sleep mode (827) for a predetermined period of time.

In some implementations, the determination (821) of whether a response was received may involve, with reference to FIG. 7A and FIG. 7B, determining whether responsive data 713 is received (716) (FIG. 7A), or whether the absence of a responsive data is detected (722) (FIG. 7B).

When the proximity alert device 100 enters a lower-power sleep mode (827), a wake-up timer may be started. When it is determined (830) that such a wake-up timer has expired, the method can include sending (818) another heartbeat ping, to confirm a persistent connection between the proximity alarm device 100 and the protected device 103.

Figure 9A:
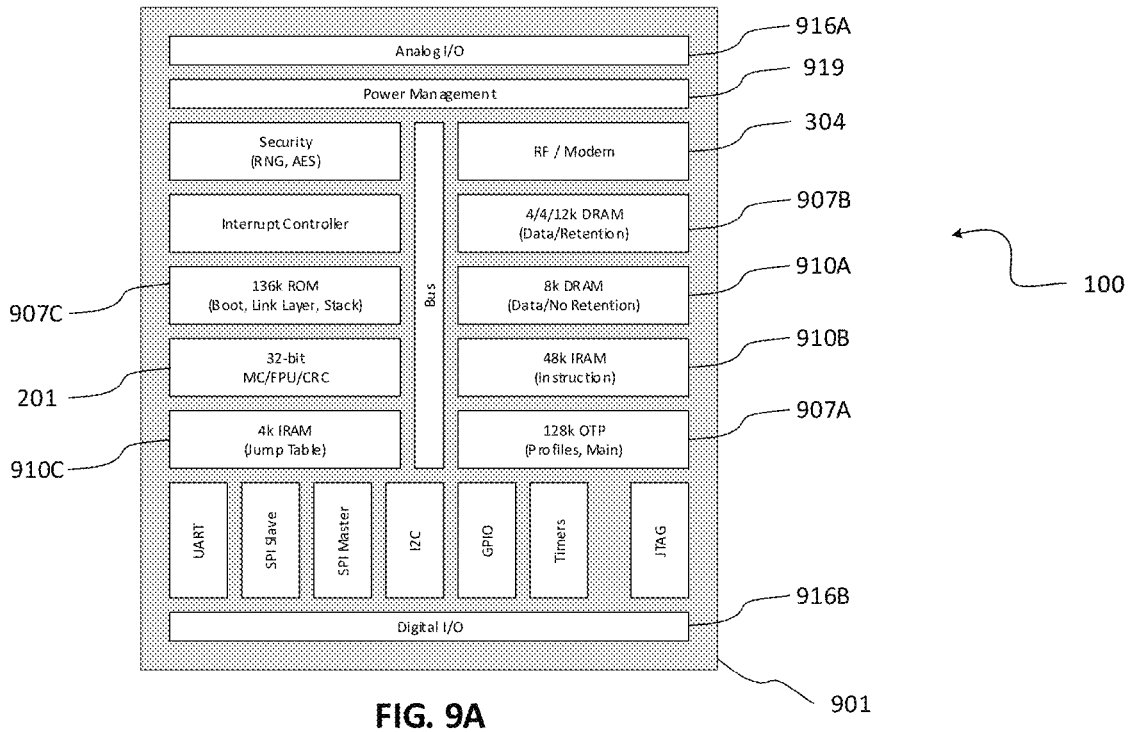
FIG. 9A is a block diagram illustrating additional hardware detail of an exemplary proximity alert device.

FIG. 9A is a block diagram illustrating additional hardware detail of an exemplary proximity alert device 100. In some implementations, the depiction in FIG. 9A is more representative of the actual electronic circuitry involved than what is shown in the high-level block diagram of FIG. 2. For example, in some implementations, the proximity alert device 100 comprises a system-on-a-chip (SoC) that implements a Bluetooth® low-energy interface (e.g., BLE, or Bluetooth® Low-Energy). In particular, some implementations leverage a device like EM Microelectronic's EM9304 device. Other implementations may implement a different device, such as a general-purpose multiprotocol SoC from Nordic Semiconductor, such as the nRF52832. The reader will appreciate that FIG. 9A and the foregoing examples are merely representative of possible devices.

As shown in the implementation in FIG. 9A, the SoC device 901 includes a CPU 201 and various forms of non-volatile memory (e.g., non-volatile memory 907A, 907B and 907C) and volatile memory (e.g., volatile memory 910A, 910B and 910C). In some implementations, non-volatile OTP (one-time programmable) memory 907A may be used to store configuration parameters and user application code that implements the methods described herein.

Upon power-up, code may be transferred from this non-volatile OPT memory 907A to another memory that is used by the CPU 201. In addition to the program code, configuration parameters, such as parameters for the RF/Modem 304 may be included—specifically, for example, configuration parameters that set the transmission power levels described with reference to FIG. 4.

A power management block 919 may implement the sleep timer and low-power mode(s) described with reference to FIG. 7A, FIG. 7B and FIG. 8. For example, this power management block 919 may periodically power down various portions of the device 901, such as volatile memories (e.g., 910A, 910B and 910C), portions of the RF/Modem 304 and various other blocks that are shown but not described in detail.

The device 901 can include additional blocks for user interface, such as, for example, an analog I/O interface 916A, which may be used, for example, to drive an audible or haptic alarm (e.g., feedback 107 depicted in FIG. 1C). A digital I/O block 916B may also be included, and this digital I/O block may be used to drive indicators, such as the indicators 102 or 104; or to receive input from input devices, such as, for example, the pushbutton 105.

Figure 9B:
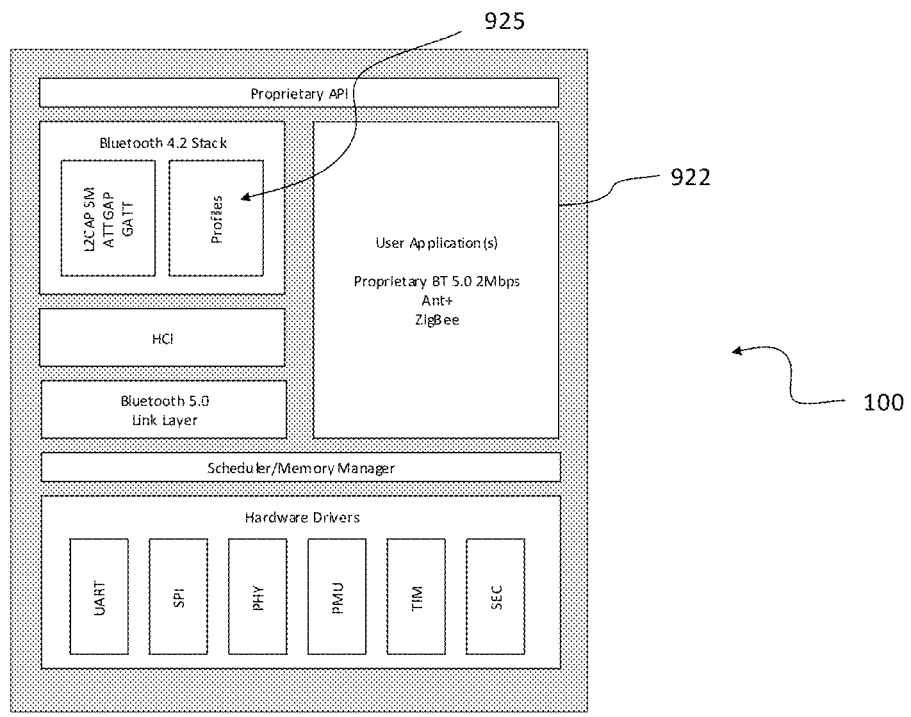
FIG. 9B is a block diagram illustrating additional software detail of an exemplary proximity alert device.

FIG. 9B is a block diagram illustrating additional software detail of an exemplary proximity alert device 100. From a software perspective, configuration profiles 925 may be stored, and these configuration profiles 925 may include settings for the transmission power levels described herein (e.g., with reference to FIG. 4). User application code may be stored in dedicated memory space 922, and this code may include software instructions that can be executed by the CPU 201 (see FIG. 9A and FIG. 2) to implement that various methods described herein, including methods 500, 504, 700, 720 and 800.

Figure 10:
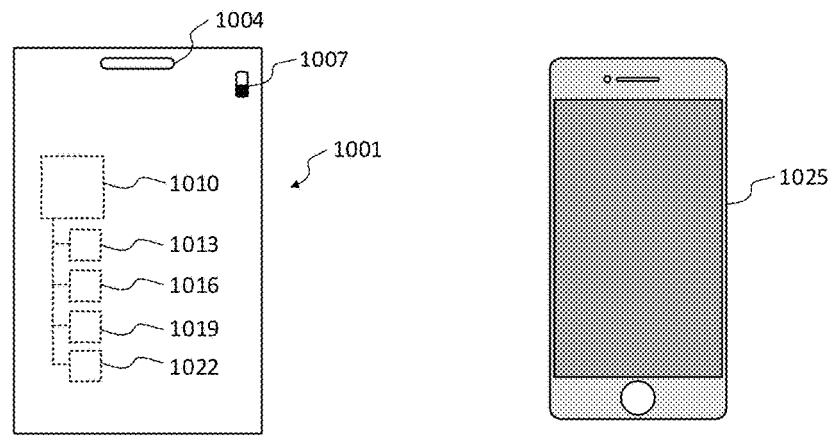
FIG. 10 illustrates another exemplary proximity alert device.

FIG. 10 illustrates another exemplary proximity alert device 1001. The proximity alert device 1001 may have the form factor of a credit card or thin badge (e.g., identification/access badge that may be utilized by personnel as identification and to secure access to a facility). In this exemplary form factor, the device 1001 can include a retaining slot 1004, for example, to receive a lanyard for securing the device to its user.

Externally, the device 1001 can include a user input device 1007, such as, for example, a slide or pushbutton switch. The user input device 1007 may control power to the proximity alert device 1001, and it may also be employed for receiving user input to control aspects of the proximity alert device 1001, such as calibration of a threshold distance associated with an alert feature or manually adjusting the threshold distance associated with an alert.

Internally, the device 1001 can include similar components as in other implementations, including, for example, a processor 1010; primary memory 1013 to store program instructions that can be executed by the processor 1010 to perform various functions; non-volatile memory 1016, for example, to store parameter settings and program code when power is not available for the primary memory; a transceiver 1019, such as a Bluetooth® transceiver configured to communicate with other devices via a Bluetooth® protocol; and an alarm device 1022. In some implementations, the alarm device 1022 is a piezo transducer capable of producing an audio and/or haptic alert; in other implementations, the alarm device 1022 includes a visible indicator, such as an LED.

In some implementations, the transducer 1019 is a Bluetooth® transceiver that is configured to communicate via a "HOGP" protocol (Human Interface Device Profile (HID) over Generic Attributes Profile (GATT) profile, or HOGP) with a protected device 1025 (e.g., a smart phone, as shown; or a laptop or other piece of equipment that is configured with a Bluetooth® transceiver). In such implementations, the proximity alert device 1001 can emulate a Human Interface Device, such as a mouse or keyboard. By emulating such a device, the proximity alert device 1001 may—after pairing with and bonding to the protected device 1025—store an identifier associated with the protected device 1025 in a whitelist that facilitates an automatic reconnection between the proximity alert device 1001 and protected device 1025 if an initial connection is lost.

Figure 11A:
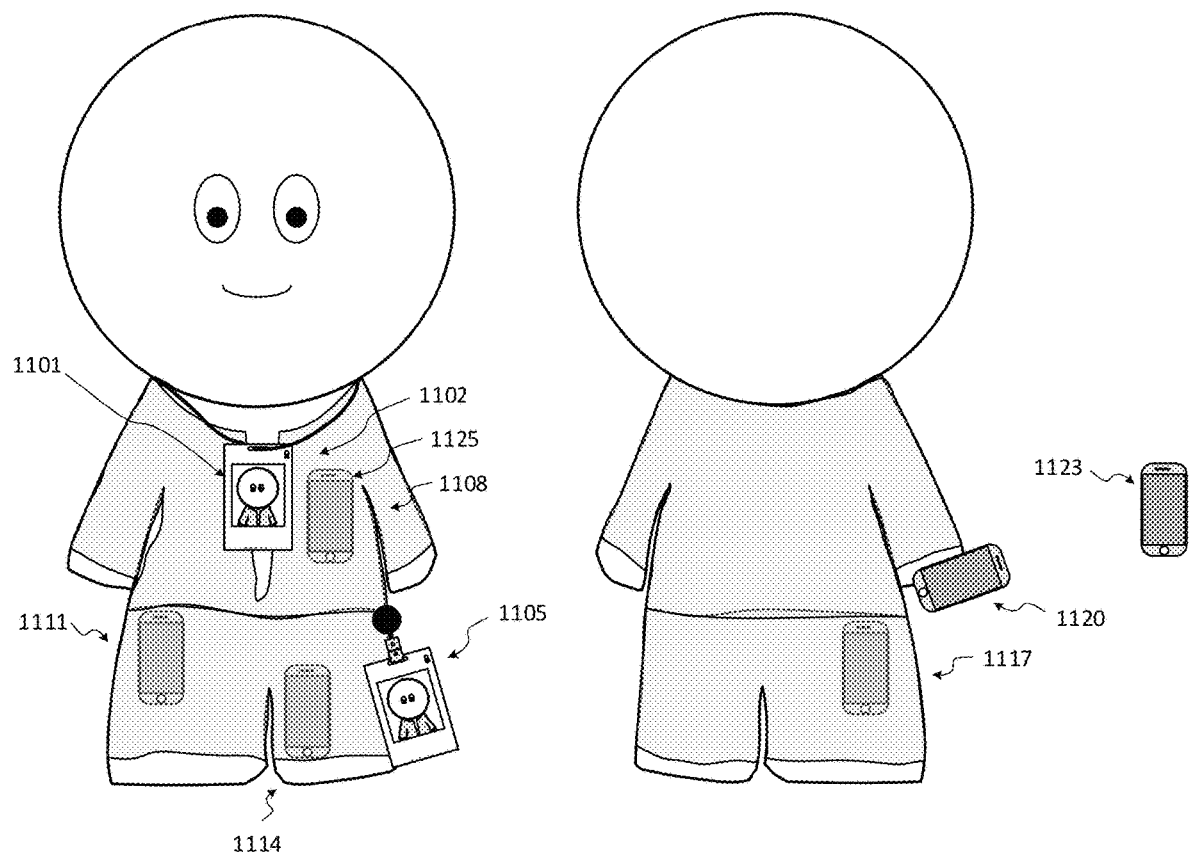
FIG. 11A illustrates various positions an exemplary proximity device may be worn or carried by a user.

FIG. 11A illustrates various positions an exemplary proximity device 1101 may be worn or carried by a user, in some implementations. For example, in configuration 1102, the device 1101 may be worn around a user's neck and retained by a lanyard. As another example, in configuration 1105, the device 1101 may be retained on or near the user's belt, for example, by a retractable badge reel.

Similarly, a paired protected device 1125 may be disposed on various positions on or around the user. For example, as depicted by configuration 1108, the protected device 1125 may be retained by an inside pocket of a jacket; as another example, as depicted by configuration 1111, the protected device 1125 may be retained by a front pants pocket; as another example, as depicted by configuration 1114, the protected device 1125 may be retained by a lower leg pocket (e.g., a knee- or calf-level pocket in a pair of cargo pants); as another example, as depicted by configuration, 1117, the protected device 1125 may be retained by a rear pants pocket; as another example, as depicted by configuration 1120, the user may typically carry the protected device 1125 in his or her hand; as another example, as depicted by configuration 1123, the protected device 1125 may typically rest on a nearby surface (e.g., a desk or work station associated with the user). Numerous other configurations are possible.

In each of the foregoing configurations, signals may propagate differently between the proximity alert device 1101 and the protected device 1125—for example, based on whether the devices 1101 and 1125 are within an uninterrupted line of sight; based on how much distance separates the devices 1101 and 1125; and based on whether a portion of the user's body is often between the devices 1101 and 1125; and based on the distance from the user's body to the alert device.

Figure 11B:
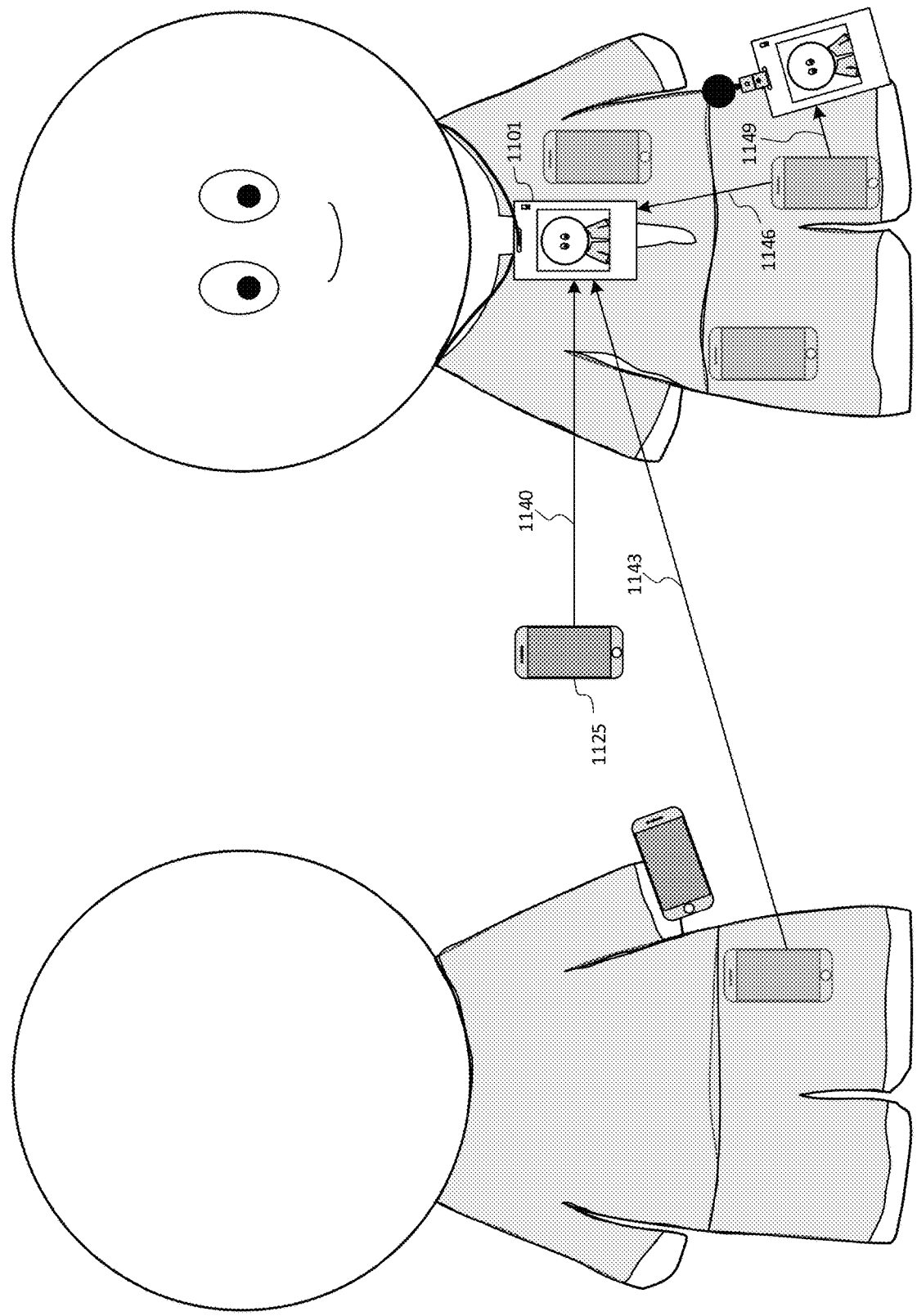
FIG. 11B depict several paths over which signals could traverse, in various exemplary implementations, between a proximity alert device and a protected device.

FIG. 11B depict several paths over which signals could traverse, in various exemplary implementations. For example, path 1140 depicts an arrangement where there is a direct line of sight (e.g., blocked only by clothing, in some implementations, but not by the body of the user himself or herself or by other objects) between the proximity alert device 1101 and the protected device 1125, but the distance may be greater than in other configurations (e.g., where the protected device is on a desk or work surface, in the general proximity of the user).

Path 1143 depicts an arrangement where there is not a direct line of sight between the proximity alert device 1101 and the protected device 1125, and where signals therebetween may have to travel through the user or on the user via surface waves, or reflect off surfaces adjacent the user (e.g., where the proximity alert device 1101 is around the neck of the user and where the protected device 1125 is in a rear pants pocket of the user).

Path 1146 depicts an arrangement where there is some distance between the proximity alert device 1101 and the protected device 1125, and where there may or may not be a direct line of sight therebetween, depending on the position of the user (e.g., where the proximity alert device 1101 is around the neck of the user and where the protected device 1125 is, for example, in a lower pocket of a user's cargo pants).

Path 1149 depicts an arrangement where there is little distance between the proximity alert device 1101 and the protected device 1125, and where there is also a direct line of sight therebetween (e.g., where the proximity alert device 1101 anchored to the users belt, such as by a retractable badge lanyard, and where the protected device 1125 is in an immediately adjacent pants pocket).

In each of these arrangements, a received signal strength indicator (RSSI) value associated with the protected device 1125 (e.g., a value transmitted with data sent from the protected device 1125 to the proximity alert device 1101, or calculated or determined by the proximity alert device 1101 based on signals received from the protected device 1125) may differ, based on the distance between the proximity alert device 1101 and the protected device 1125, and based further on whether there is a direct line of sight therebetween and/or whether the signals must penetrate, follow the surface of or reflect around objects or the user himself or herself.

In some implementations, an RSSI value may range from −100 and 0, with zero representing a stronger signal and −100 representing a very weak signal. By way of example, in some implementations, given a particular transmission power level of the proximity alert device 1101, an RSSI associated with the protected device 1125 may be −75 for path 1143, −56 for path 1146, −43 for path 1140 and −28 for path 1149.

These numbers are merely exemplary to illustrate the principles described herein; each device is different (e.g., with respect to its physical orientation and the orientation and nature of its antenna and transceiver), and there may not be a precise correlation between RSSI values and signal power or between RSSI values of different devices. Thus, for example, one protected device in a given arrangement relative to a proximity alert device may provide one RSSI value, and a different protected device in the same arrangement relative to the same proximity alert device may provide a different RSSI. It is for this reason that some implementations described herein do not rely on RSSI values directly to infer distance between the proximity alert device and the protected device. This point notwithstanding, it may still be advantageous to employ (e.g., during a user-initiated calibration process of threshold distances for alerts) RSSI values to set transmission power levels, as will now be described.

In some implementations, it may be possible to establish a reference RSSI value, against which configuration-specific RSSI values can be compared, in order to adjust transmission power levels of the proximity alert device 1101. For example, in some implementations, an RSSI value of between about (e.g., within 1%, 2%, 5%, 10%, 20%, 25% or 50% of a nominal value) −50 and about −75 may typically (e.g., across multiple protected devices) correspond to an alert threshold that is within about 10-20 feet of the user (e.g., a distance that may not result in many false alerts, but that may also provide a user with a timely notification before the user is too far from his or her protected device, such that quick retrieval is possible). In such implementations, if, during a user-initiated calibration process for a given arrangement of proximity alert device and protected device, an instant RSSI value is higher than this ideal range (or than a stored reference RSSI value in that range), the transmission power may be lowered; on the other hand, if the instant RSSI value is lower than this ideal range (or a stored reference RSSI value in that range), the transmission power may be increased.

In some implementations, a comparison may be made between an instant RSSI value and a stored reference RSSI value, and if the instant RSSI value is greater than the stored reference RSSI value by more than a first threshold (e.g., 10 RSSI units (sometimes specified in dB or dBm by specific manufacturers of transceiver devices)), the transmission power may be lowered. Similarly, if the instant RSSI value is less than the stored reference RSSI value by more than a second threshold (e.g., 7 RSSI units), the transmission power may be increased. In some implementations, the first threshold and the second threshold may be different; in other implementations, the first threshold and the second threshold may be the same.

In some implementations, then, it may be advantageous to adjust a threshold at which the proximity alert device 1101 provides an indication or alert when more than a threshold distance is detected or inferred to exist between the proximity alert device 1101 and a protected device 1125.

Figure 12:
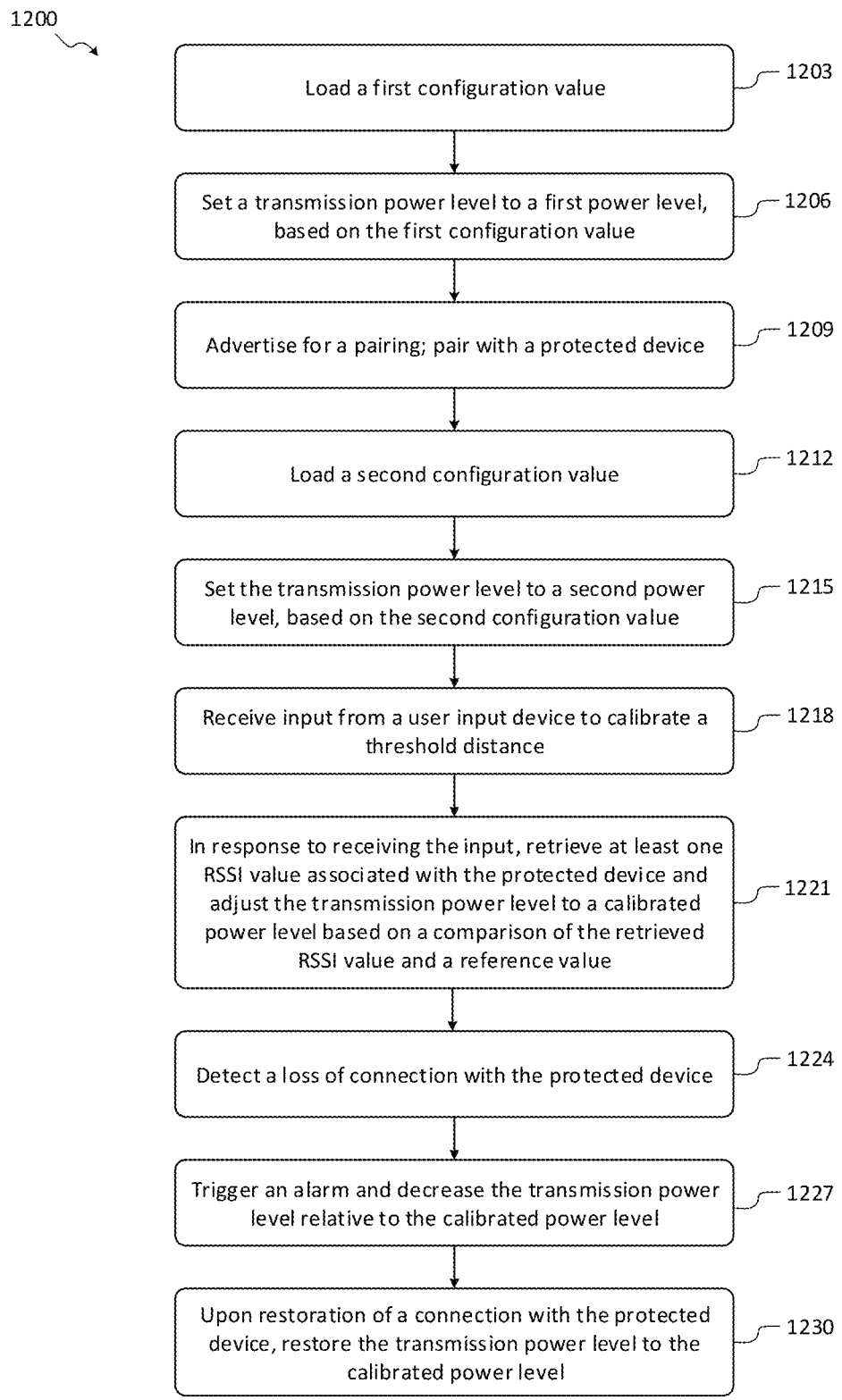
FIG. 12 is a flow diagram of an exemplary method of alarming a condition in which a proximity alert device and a protected device are inferred to be separated by a physical distance that is greater than a threshold distance.

FIG. 12 is a flow diagram of an exemplary method 1200 of alarming a condition in which a proximity alert device and a protected device are inferred to be separated by a physical distance that is greater than a threshold distance. In one implementation, as shown, the method 1200 includes loading (1203) a first configuration value and setting (1206) a transmission power level to a first power level, based on the first configuration value. For example, with reference to FIG. 10, a processor 1010 may execute instructions stored in primary memory 1013 that cause the processor 1010 to load (1203) a first configuration value from non-volatile memory 1016. The processor 1010 may then cause a transmission power level of the transceiver 1019 to be set to a first transmission power level (e.g., by writing to a configuration register in the transceiver 1019), which first transmission power level is based on the first configuration value. In some implementations, the first configuration value may be a register word that can be directly written to the transceiver 1019, corresponding to the first transmission power level.

In some implementations, the specific transmission power level may be selected from a plurality of possible transmission power levels. For example, a particular transceiver 1019 may have factory-defined power levels specified in dBm and at specific levels, such as +4 dBm, 0 dBm, −4 dBm, −8 dBm, −12 dBm, −16 dBm, and −20 dBm. Another transceiver may have factory-defined power levels at +4 dBm, +3 dBm, 0 dBm, −4 dBm, −8 dBm, −12 dBm, −16 dBm, −20 dBm and −40 dBm. Another transceiver may have factory-defined power levels spanning a broader or narrower range or having fewer or a greater number of steps. Yet another transceiver may facilitate user programming of specific power levels, rather than limiting users to specific, pre-defined power levels. Whatever the details of the specific transceiver, in some implementations, an initial power level may be set at a level that reliably facilitates pairing between a proximity alert device and a wide variety of protected devices, in a large number of common arrangements. For example, in some implementations, the first transmission power level may be set to 0 dBm, −4 dBm, −8 dBm or −12 dBm.

The method 1200 further includes advertising for a pairing and subsequently pairing with a protected device. For example, with reference to FIG. 10, the proximity alert device 1001 may advertise (e.g., at the first transmission power level previously set) for a connection, and a connection may be subsequently established between the proximity alert device 1001 and the protected device 1025.

In some implementations, the advertising and pairing occurs automatically, without user action. In other implementations, some user action is required to initially pair the devices (e.g., the user may need to actuate the user input device 1007 (a slide, push-button or touch switch, in some implementations), for a particular period of time, to initiate the pairing).

In some implementations, the advertising and pairing occurs over a specific protocol, such as a Bluetooth® HOGP protocol. In such implementations, this HOGP protocol may have the advantage of facilitating automatic reconnection between the devices after an initial pairing, as occurs with HIDs such as a mices, keyboards, earbuds, hands-free systems, and other systems that rely on the HOGP protocol. That is, the proximity alert device 1001 may emulate an HID in the context of a HOGP protocol.

In some implementations, automatic reconnection process is facilitated by storage of unique identifiers for one or both of the devices. For example, the protected device 1025 may, upon connection with the proximity alert device 1001, store an identifier associated with either the proximity alert device 1001 or the protected device 1025 in a whitelist; and subsequent reconnections may be possible only because such an identifier is stored in the whitelist. More particularly, in some implementations, the protected device 1025 stores an identifier associated with the proximity alert device 1001 in a whitelist.

The method 1200 may include loading (1212) a second configuration value and setting (1215) a transmission power level to a second power level, based on the second configuration value. For example, with reference to FIG. 10, a processor 1010 may execute instructions stored in primary memory 1013 that cause the processor 1010 to load (1212) a second configuration value from non-volatile memory 1016. The processor 1010 may then cause a transmission power level of the transceiver 1019 to be set to a second transmission power level (e.g., by writing to a configuration register in the transceiver), which second transmission power level is based on the second configuration value. In some implementations, the second configuration value may be a register word that can be directly written to the transceiver 1019, corresponding to the second transmission power level.

In some implementations, the second transmission power level may be lower than the first transmission power level, and it may be selected to facilitate disconnection between the proximity alert device 1001 and the protected device 1025 at distances that minimize false alerts generated from common activities (e.g., a user walking to a nearby printer while leaving a protected device on a primary work surface), while still providing alerts soon enough to be actionable by the user (e.g., alerting the user on a bus, if the user inadvertently leaves the protected device 1025 on a seat and starts to exit the bus). For example, in implementations in which the first transmission power level is −12 dBm, the second transmission power level may be set to −20 dBm; as another example, in implementations in which the first transmission power level is −8 dBm, the second transmission power level may be set to −12 dBm or −16 dBm.

In some implementations, the second transmission power level may be greater than the first transmission power level to accommodate a greater distance between the proximity alert device 1001 and the protected device 1025 (e.g., in an office environment in which the protected device 1025 is typically left on a work surface, where the user may routinely leave the immediate vicinity of the work surface in order to, for example, access office equipment elsewhere in the office environment).

The reader will appreciate that many first and second transmission power levels are possible. The reader will further appreciate that given the various permutations of protected device 1025 and physical arrangements of the protected device 1025 and the proximity alert device 1001, benefit to the user may be realized by additional calibration or adjustment.

Such additional calibration or adjustment may be user-initiated. For example, the exemplary method 1200 includes receiving (1218) input from the user input device to calibrate the threshold distance. For example, with reference to FIG.

10, input may be received (1218) from the user input device 1007. In some implementations, the input device 1007 may be used to provide input for several different functions. For example, a pushbutton switch 1007 may be used to receive input to power on the proximity alert device 1001 (e.g., with a short press), initially pair the proximity alert device 1001 to a protected device (e.g., with an intermediate press), to initiate calibration (e.g., with a long press), or to enter manual transmission power level adjustment mode (e.g., with a command, such as a button press sequence comprising a long press and two short presses).

Other variations for receiving user input are possible. For example, slide or pushbutton switches may be employed, touch sensors, proximity sensors, light sensors, motion sensors; a mechanical switching action may be required, taps may be required, a sensor may be covered and uncovered for a specific period of time, the entire proximity alert 1001 device may be shaken to provide a gesture or motion-based input; in some implementations, a user interface on a corresponding application (e.g., on the protected device 1025) may be employed, etc.

In some implementations, user-initiated input to calibrate a threshold distance may be received from the user when the proximity alert device and protected device are in a customary arrangement for that user. For example, users who routinely wear proximity alert devices around their necks and carry their protected devices (e.g., smart phones) in their back pockets may want to calibrate the threshold distance (e.g., increase the transmission power level) to avoid false alerts. Similarly, users who customarily carry their protected devices very close to their proximity alert devices (e.g., proximity alert device on a retractable ID badge reel anchored at waist level, with the protected device in an adjacent pocket) may want to calibrate the threshold distance (e.g., decrease the transmission power level) to avoid allowing too much separation between the proximity alert device and the protected device before an alert is issued.

In some implementations, the method 1200 includes, in response to receiving (1218) the input, retrieving (1221) at least one value for a received signal strength indicator (RSSI) associated with the paired protected device, and adjusting the transmission power level to a calibrated power level based on a comparison of the at least one value to a stored reference value.

For example, with reference to FIG. 11B, a user may be wearing the proximity alert device 1101 around his or her neck, and the protected device may be stored in a back pants pocket (e.g., arrangement 1143). A corresponding RSSI value may be retrieved (1221) (e.g., −75), and this retrieved value may be compared to a stored reference value (e.g., a reference value, such as −50, stored in non-volatile memory). Based on this comparison, the transmission power level may be adjusted. In this example, given that the instant value of −75 is more than a first threshold than the stored value of −50 (25 less here, but the first threshold could be, for example, 10), the transmission power level may be increased. In some implementations, the transmission power level is adjusted in specific increments, such as, for example, 4 dBm. Thus, in this example, if the transmission power level was originally at −16 dBm, the transmission power level may be calibrated to a level of −12.

As another example, again with reference to FIG. 11B, a user may be wearing the proximity alert device 1101 on his or her belt, and the protected device may be stored in an adjacent pants pocket (e.g., arrangement 1149). A corresponding RSSI value may be retrieved (1221) (e.g., −28), and this retrieved value may be compared to a stored reference value (e.g., a reference value, such as −50, stored in non-volatile memory). Based on this comparison, the transmission power level may be adjusted. In this example, given that the instant value of −28 is more than a second threshold greater than the stored value of −50 (22 more here, but the second threshold could be the same as or different from the first threshold (e.g., 7, in one implementation)), the transmission power level may be decreased. Thus, in this example, if the transmission power level was originally at −16 dBm, the transmission power level may be calibrated to a level of −20.

In some implementations, the adjusted transmission power level is stored in non-volatile memory as a calibrated power level, such that it can be loaded and used to reset the transmission power level after power to the proximity alert device is lost, or after a connection between the proximity alert device and protected device is lost, then restored.

As shown, the method 1200 further includes detecting (1224) a loss of connection with the protected device. For example, with reference to FIG. 11A, the proximity alert device 1101 and the protected device 1125 may periodically exchange data. More particularly, the proximity alert device 1101 may send data to the protected device 1125, and the protected device 1125 may reply with responsive data. If expected responsive data is not received within a specific period of time (e.g., a timeout period on the order of, for example, tens of milliseconds), the proximity alert device 1101 may trigger (1227) an alert (e.g., with reference to FIG. 10, by activating an alarm device 1022, such as a piezo transducer). With reference to FIG. 11A, with the protected device 1125 in configuration 1123 (e.g., on a work surface adjacent the user), a connection between the protected device 1125 and the proximity alert device 1101 may be lost (e.g., when the user walks away from the protected device 1125), and this loss may be detected (1224), resulting in the triggering (1227) of the alarm.

In some implementations, at the same time an alarm is triggered (1227), the transmission power level may be decreased (1227) relative to the calibrated power level. For example, if the calibrated transmission power level was at −12 dBm, it may be reduced to −16 dBm upon triggering (1227) of the alarm. In some implementations, reducing the transmission power level upon triggering (1227) of the alarm may provide hysteresis between a disconnection threshold and reconnection threshold, thereby eliminating or reducing false alerts at or near the distance at which the connection is lost.

As shown, the method 1200 may further include, upon restoration of a connection with the paired protected device, restoring (1230) the transmission power level to the calibrated power level. For example, if the calibrated power level is −12 dBm and (with reference to FIG. 11A) the connection between the proximity alert device 1101 and the protected device 1125 is lost and the transmission power level is reduced to −16 dBm, the transmission power level may be restored to −12 dBm when the connection between the proximity alert device 1101 and the protected device 1125 is restored.

Various steps in the method 1200 have been described. In some implementations, additional steps may be added, steps may be removed, or steps may be reordered. For example, in some implementations, steps 1212 and 1215 may be omitted. In some implementations, the transmission power level may not be reduced when an alarm is triggered at step 1227. In some implementations, transmission power levels may be calibrated without reference to RSSI signals.

In some implementations the user may manually reduce the transmission power levels via the user input device. For example, in some implementations, step 1221 may be replaced with a manual, user-initiated adjustment, in response to receiving input (1218) to make the adjustment. More particularly, upon receipt of such input, the transmission power may be adjusted up or down by a specific increment. A user wanting to extend the alert range may initiate manual adjustment upward of the transmission power level with one type of input (e.g., with long press, followed by one short press of a pushbutton switch). Such input may cause an implementation to reduce the transmission power level by 4 dBm, or some other pre-defined increment (e.g., 2 dBm, 1 dBm, 8 dBm, etc.). Another user wanting to reduce the alert range may initiate adjustment downward of the transmission power level (e.g., with a long press, followed by two short presses of a pushbutton switch). Such input may cause an implementation to increase the transmission power level by 4 dBm, or some other pre-defined increment.

In general, various implementations have been described herein, but the reader will appreciate that other implementations are within the scope of this description. For example, many of the actions described herein are described within the context of the proximity alert device; but these methods may be implemented in the protected device, or in a combination of the proximity alert device and the protected device, or in combination of the proximity alert device and another proximity alert device, each device functioning as both a proximity alert device and a protected device. Either protected device or proximity alert device could take various forms, other than the mobile communication device and key fob or ID badge that are depicted and described herein. Some methods may be implemented with steps in different orders, and the functions described may be implemented in ways other than as described. Certain functions may be implemented in software, hardware, firmware or a combination of all or some of these forms. Various user interfaces could substitute those described herein. Bluetooth® interfaces and protocols are described, but other radio frequency-based interfaces and communications protocols could be employed. Different thresholds or timeout periods may be employed. Therefore, it is intended that the scope not be limited to the particular aspects or implementations disclosed but include all aspects falling within the scope of the appended claims.

What is claimed is:

1. A method of alerting a user comprising:
   loading, in a proximity alert device having a processor, non-volatile memory, a user input device, and a Bluetooth transceiver, a first configuration value from the non-volatile memory and setting a transmission power level of the Bluetooth transceiver, based on the loaded first configuration value, to a first power level selected from a plurality of power levels comprising +4 dBm, 0 dBm, −4 dBm, −8 dBm, −12 dBm, −16 dBm, and −20 dBm;
   advertising for a pairing and subsequently pairing and bonding with a protected device that also has Bluetooth transceiver, via a Human Interface Device Profile (HID) over Generic Attributes Profile (GATT) profile (HOGP);
   upon pairing and bonding with the protected device, loading a second configuration value from the non-volatile memory and setting the transmission power level to a second power level that is less than the first power level;
   receiving input from the user input device to calibrate a threshold distance that is inferred to exist between the proximity alert device and the protected device;
   in response to receiving the input, retrieving at least one value for a received signal strength indicator (RSSI) associated with the paired protected device, and based on a comparison of the at least one value to a stored reference value, increasing the transmission power level by at least 4 dBm if the at least one value is less than the stored reference value by more than a first threshold, and decreasing the transmission power level by at least 4 dBm if the at least one value is greater than the stored reference value by more than a second threshold, and saving to non-volatile memory the increased or decreased transmission power level as a calibrated power level;
   detecting a loss of connection with the paired protected device;
   in response to detecting the loss of connection, triggering an alarm and decreasing the transmission power level relative to the calibrated power level; and
   upon restoration of a connection with the paired protected device, restoring the transmission power level to the calibrated power level.

2. A method of alerting a user, the method comprising:
   loading, in a proximity device comprising a processor, non-volatile memory, a user input device, and a Bluetooth transceiver, a first configuration value from the non-volatile memory and setting a transmission power level of the Bluetooth transceiver, based on the loaded first configuration value, to a first power level from among a plurality of power levels;
   advertising for, via a Bluetooth protocol, a pairing, and subsequently pairing with a protected device that also has a Bluetooth transceiver;
   receiving input from the user input device to calibrate a threshold distance that is inferred to exist between the proximity alert device and the protected device;
   in response to receiving the input, retrieving at least one value for a received signal strength indicator (RSSI) associated with the paired protected device, and based on a comparison of the at least one value to a stored reference value, adjusting the transmission power level of the Bluetooth transceiver up or down, and saving to the non-volatile memory the adjusted transmission power level as a calibrated power level;
   detecting a loss of connection with the paired protected device;
   in response to detecting the loss of connection, triggering an alarm.

3. The method of claim 2, wherein pairing comprises pairing via a Human Interface Device Profile (HID) over Generic Attributes Profile (GATT) profile (HOGP).

4. The method of claim 3, wherein pairing comprises bonding, wherein an identifier associated with the protected device or the proximity alert device is stored in a whitelist.

5. The method of claim 2, wherein triggering an alarm comprises providing a visual indication, providing an audible tone and providing haptic feedback.

6. The method of claim 2, wherein setting a transmission power level comprises configuring the gain of a power amplifier in the Bluetooth transceiver.

7. The method of claim 2, wherein the plurality of power levels comprises +4 dBm, +3 dBm, 0 dBm, −4 dBm, −8 dBm, −12 dBm, −16 dBm and −20 dBm.

8. The method of claim 2, wherein the plurality of power levels comprises +4 dBm, 0 dBm, −4 dBm, −8 dBm, −12 dBm, −16 dBm, −20 dBm and −40 dBm.

9. The method of claim 2, wherein the first power level is selected from among 0 dBm, −4 dBm, −8 dBm and −12 dBm.

10. The method of claim 2, further comprising, upon pairing with the protected device, loading a second configuration value from the non-volatile memory and setting a transmission power level of the Bluetooth transceiver, based on the loaded second configuration value, to a second power level that is lower than the first power level.

11. The method of claim 10, wherein the first power level is selected from among −8 dBm, −12 dBm and −16 dBm; and the second power level is selected from among −12 dBm, −16 dBm and −20 dBm.

12. The method of claim 2, wherein adjusting the transmission power level comprises increasing the transmission power level if the at least one value is less than the stored reference value by more than a first threshold, and decreasing the transmission power level if the at least one value is greater than the stored reference value by more than a second threshold.

13. The method of claim 2, further comprising periodically sending data, via the Bluetooth protocol, to the paired protected device.

14. The method of claim 13, wherein detecting a loss of connection comprises determining that a response from the paired protected device has not been received in response to the periodically sent data.

15. The method of claim 2, further comprising decreasing the transmission power level of the Bluetooth transceiver relative to the calibrated power level when triggering the alarm.

16. The method of claim 15, further comprising, upon restoration of a connection with the paired protected device, restoring the transmission power level to the calibrated power level.

17. A proximity alert device comprising
a processor,
non-volatile memory;
a user input device;
a radio transceiver; and
primary memory that stores program instructions to be executed by the processor, the program instructions comprising instructions that, when executed, perform a method comprising:
  loading a configuration value from the non-volatile memory and setting a transmission power level of the radio transceiver, based on the loaded first configuration value, to a configuration power level from among a plurality of power levels;
  advertising for a pairing and subsequently pairing, via a Human Interface Device Profile (HID) over Generic Attributes Profile (GATT) profile (HOGP) Bluetooth protocol, with a protected device that has a corresponding radio transceiver;
  receiving input from the user input device to adjust the transmission power level up or down by a predetermined increment;
  in response to receiving the input, and based upon that input, adjusting the transmission power level of the radio transceiver up or down by the predetermined increment, and saving to the non-volatile memory the adjusted transmission power level as a calibrated power level;
  detecting a loss of connection with the paired protected device;
  in response to detecting the loss of connection, triggering an alarm.

18. The proximity alert device of claim 17, wherein the method further comprises, upon pairing with the protected device, loading a second configuration value from the non-volatile memory and setting the transmission power level, based on the loaded second configuration value, to a second power level that is lower than the first power level.

19. The proximity alert device of claim 17, wherein receiving input from the user device comprises receiving a first command to adjust the transmission power up or receiving a second command that is different than the first command to adjust the transmission power down.

* * * * *